US012767468B2

(12) United States Patent
Sugaya et al.

(10) Patent No.: US 12,767,468 B2
(45) Date of Patent: Oct. 20, 2026

(54) SHEET CONVEYANCE APPARATUS AND IMAGE FORMING APPARATUS

(71) Applicant: CANON KABUSHIKI KAISHA, Tokyo (JP)

(72) Inventors: Hajime Sugaya, Shizuoka (JP); Keita Sato, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1045 days.

(21) Appl. No.: 17/941,485

(22) Filed: Sep. 9, 2022

(65) Prior Publication Data

US 2023/0105752 A1 Apr. 6, 2023

(30) Foreign Application Priority Data

Oct. 4, 2021 (JP) ................................ 2021-163268

(51) Int. Cl.
*B65H 7/20* (2006.01)
*B65H 7/02* (2006.01)
*G03G 15/00* (2006.01)

(52) U.S. Cl.
CPC ................ *B65H 7/20* (2013.01); *B65H 7/02* (2013.01); *G03G 15/6529* (2013.01); *B65H 2403/724* (2013.01); *B65H 2403/80* (2013.01); *B65H 2513/10* (2013.01); *B65H 2513/50* (2013.01)

(58) Field of Classification Search
CPC ...... B65H 7/20; B65H 7/02; B65H 2403/724; B65H 2403/80; B65H 2513/10; B65H 2513/50; G03G 15/6529
See application file for complete search history.

(56) References Cited

U.S. PATENT DOCUMENTS

| | | | | |
|---|---|---|---|---|
| 6,504,964 | B1 * | 1/2003 | Hasegawa ............ | G02B 21/248 385/16 |
| 2014/0320877 | A1 | 10/2014 | Kaneko et al. | |
| 2017/0269535 | A1 * | 9/2017 | Suzuki ............... | G03G 15/6529 |
| 2018/0278775 | A1 * | 9/2018 | Oizumi .............. | H04N 1/00602 |
| 2022/0072874 | A1 * | 3/2022 | Calapis .................. | B65H 5/062 |

FOREIGN PATENT DOCUMENTS

| | | | |
|---|---|---|---|
| JP | 2014215428 | A | 11/2014 |
| JP | 2018203424 | A | 12/2018 |
| JP | 2019073395 | A | 5/2019 |
| JP | 2019099282 | A | 6/2019 |

* cited by examiner

*Primary Examiner* — Thomas A Morrison
(74) *Attorney, Agent, or Firm* — ROSSI, KIMMS & McDOWELL LLP

(57) ABSTRACT

A sheet conveyance apparatus includes a drive source, a conveyance portion, a transmission mechanism configured to switch between a first state and a second state, a load detection portion configured to detect a load acting on the drive source, and a control portion configured to control the drive source and the transmission mechanism. The control portion is configured to change, on a basis of a detection result of the load detection portion, a timing in the conveyance operation at which a control signal for switching the transmission mechanism from the first state to the second state is issued, the timing being changed in accordance with a delay time from when the control signal is issued to when change in the load corresponding to the switching of the transmission mechanism from the first state to the second state appears.

12 Claims, 12 Drawing Sheets

SHEET CONVEYANCE APPARATUS AND IMAGE FORMING APPARATUS

BACKGROUND OF THE INVENTION

Field of the Invention

The present invention relates to a sheet conveyance apparatus that conveys a sheet and an image forming apparatus that forms and image on a sheet.

Description of the Related Art

An image forming apparatus such as a printer, a copier, a multifunctional apparatus, or the like includes a system that controls drive transmission from a drive source to a conveyance portion such as a conveyance roller by using an actuator such as an electromagnetic clutch to convey a sheet used as a recording medium to an image forming portion at a predetermined timing. Japanese Patent Laid-Open No. 2019-73395 discloses performing speed change control at a speed change timing set in consideration of expected change in the drive load in a case where the drive load of a motor is changed by disengaging an electromagnetic clutch during the speed change control for changing the sheet conveyance speed in accordance with an ideal position of a leading end of a sheet. Japanese Patent Laid-Open No. 2019-99282 discloses estimating a delay time from when a command signal to couple an electromagnetic clutch is output to when the electromagnetic clutch is actually coupled by detecting a current value of a current supplied to a motor, and changing an output timing of the command signal on the basis of the estimated value of the delay time.

In the configurations described in the above documents, the rotational speed of the motor is changed to change the sheet conveyance speed. However, a configuration in which the sheet conveyance speed is changed by a mechanical transmission mechanism interposed between the motor and the conveyance portion has been also considered to advance shared use of the drive source. In such a configuration, it has been found that there is a deviation caused by the individual difference of the transmission mechanism or the like in the timing at which the sheet conveyance speed of the conveyance portion actually changes after the command signal for switching the transmission ratio of the transmission mechanism. If the deviation of the timing at which the sheet conveyance speed changes becomes large due to such factors, there is a possibility that the precision of the sheet position in the sheet conveyance operation decreases, which can cause deterioration of the productivity of the image forming apparatus.

SUMMARY OF THE INVENTION

The present invention provides a sheet conveyance apparatus and an image forming apparatus that can improve precision of a sheet position in a sheet conveyance operation.

According to one aspect of the invention, a sheet conveyance apparatus includes a drive source configured to generate a driving force, a conveyance portion configured to be driven by the driving force to convey a sheet, a transmission mechanism configured to switch between a first state in which the transmission mechanism transmits the driving force to the conveyance portion at a first transmission ratio, and a second state in which the transmission mechanism transmits the driving force to the conveyance portion at a second transmission ratio different from the first transmission ratio, a load detection portion configured to detect a load acting on the drive source, and a control portion configured to control the drive source and the transmission mechanism and execute a conveyance operation in which the conveyance portion conveys the sheet, wherein the control portion is configured to change, on a basis of a detection result of the load detection portion, a timing in the conveyance operation at which a control signal for switching the transmission mechanism from the first state to the second state is issued, the timing being changed in accordance with a delay time from when the control signal is issued to when change in the load corresponding to the switching of the transmission mechanism from the first state to the second state appears.

According to another aspect of the invention, a sheet conveyance apparatus includes a motor configured to generate a driving force, a conveyance portion configured to be driven by the driving force to convey a sheet, a transmission mechanism including an electromagnetic clutch and configured to transmit the driving force to the conveyance portion and switch, in accordance with power supply to the electromagnetic clutch being turned on or off, between a first state in which the conveyance portion conveys the sheet at a first speed and a second state in which the conveyance portion conveys the sheet at a second speed lower than the first speed, a current detection circuit configured to detect a current supplied to the motor, a sensor configured to issue a detection signal in response to the sheet conveyed by the conveyance portion, and a control portion configured to control the motor and the electromagnetic clutch and execute a conveyance operation in which the conveyance portion conveys the sheet, wherein the control portion is configured to issue a control signal for switching the transmission mechanism from the first state to the second state before the conveyance operation is started, and change a timing of the control signal in the conveyance operation in accordance with a first response time from when the control signal is issued to when the current detected by the current detection circuit starts decreasing, such that (i) in a case where a length of the first response time is a first time length, the control signal is issued at a first timing after the sensor has issued the detection signal during the conveyance operation, and (ii) in a case where the length of the first response time is a second time length longer than the first time length, the control signal is issued at a second timing that is after the sensor has issued the detection signal during the conveyance operation and that is earlier than the first timing.

According to still another aspect of the invention, a sheet conveyance apparatus includes a motor configured to generate a driving force, a conveyance portion configured to be driven by the driving force to convey a sheet, a transmission mechanism including an electromagnetic clutch and configured to transmit the driving force to the conveyance portion and switch, in accordance with power supply to the electromagnetic clutch being turned on or off, between a first state in which the conveyance portion conveys the sheet at a first speed and a second state in which the conveyance portion conveys the sheet at a second speed lower than the first speed, a current detection circuit configured to detect a current supplied to the motor, a sensor configured to issue a detection signal in response to the sheet conveyed by the conveyance portion, and a control portion configured to control the motor and the electromagnetic clutch and execute a conveyance operation in which the conveyance portion conveys the sheet, wherein the control portion is configured to issue a control signal for switching the transmission mechanism from the first state to the second state before the conveyance operation is started, and change a timing of the control signal in the conveyance operation in accordance with a second response time from when the control signal is issued to when the current detected by the current detection circuit reaches a local minimum value after the current detected by the current detection circuit has started decreasing, such that (i) in a case where a length of the second response time is a third time length, the control signal is issued at a third timing after the sensor has issued the detection signal during the conveyance operation, and (ii) in a case where the length of the second response time is a fourth time length longer than the third time length, the control signal is issued at a fourth timing that is after the sensor has issued the detection signal during the conveyance operation and that is later than the third timing.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

Figure 1:
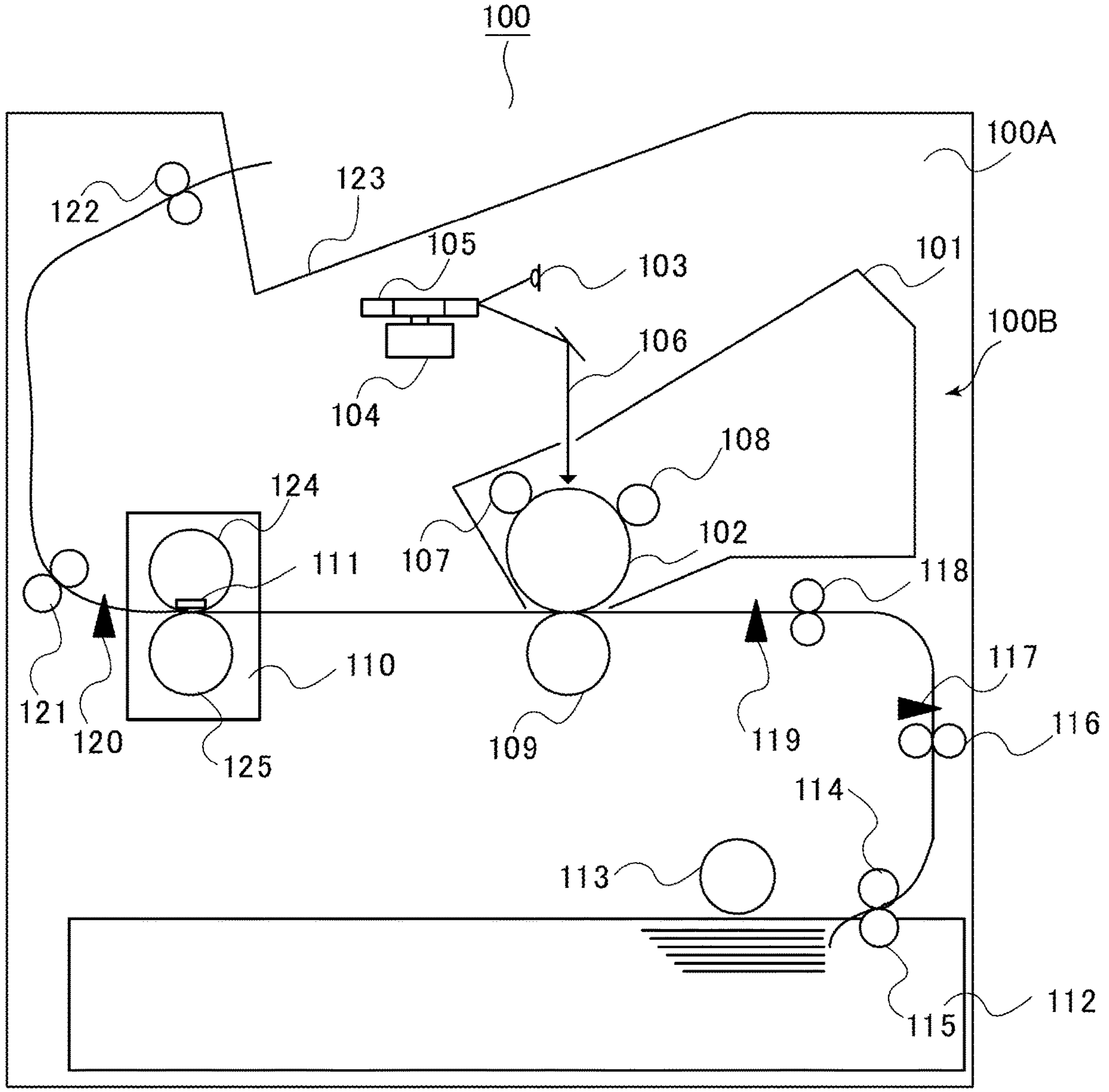
FIG. 1 is a schematic view of an image forming apparatus according to a first embodiment.

An overall configuration of an image forming apparatus according to a first embodiment will be described with reference to FIG. 1. An image forming apparatus 100 according to the present embodiment is a laser beam printer including an image forming portion 100B of an electrophotographic system in a casing 100A serving as an apparatus body. The image forming apparatus 100 is capable of forming an image on a sheet on the basis of image information input from an external computer. As the sheet serving as a recording medium, various sheet materials of different sizes and materials can be used. Examples of the various sheet materials include paper sheets such as plain paper sheets and cardboards, plastic films, cloths, surface-treated sheet materials such as coated paper sheets, and sheet materials of irregular shapes such as envelops and index paper sheets.

The image forming portion 100B includes a process cartridge 101 attachable to and detachable from the casing 100A, and an optical system (103 to 106) constituting an exposing unit. The process cartridge 101 includes a photosensitive drum 102 that is an electrophotographic photosensitive member serving as an image bearing member, a charging roller 107 serving as a charging unit, and a developing roller 108 serving as a developing unit, and the process cartridge 101 accommodates toner as developer. The exposing unit includes a semiconductor laser 103 serving as a light source, a rotary polygon mirror 105 that reflects laser light emitted from the semiconductor laser 103, and a scanner motor 104 that rotates the rotary polygon mirror 105. In addition, a transfer portion for transferring an image onto a sheet is formed as a nip portion between the photosensitive drum 102 and a transfer roller 109 opposing the photosensitive drum 102.

A fixing unit 110 of a thermal fixation type is disposed downstream of the transfer portion in the sheet conveyance path. The fixing unit 110 includes a fixing roller 124, a pressurizing roller 125 that is in pressure contact with the fixing roller 124, and a heater 111 that heats the fixing roller 124.

In addition, the image forming apparatus 100 includes a feed cassette 112 serving as an accommodating portion or a supporting portion in which a sheet is supported and accommodated, and a plurality of conveyance portions (113, 114, 115, 116, 118, 121, and 122) that feed and convey the sheet. A pickup roller 113 is a feeding member that feeds the sheet from the feed cassette 112. A feed roller 114 is a conveyance member that conveys the sheet fed by the pickup roller 113. A retard roller 115 is a separation member that forms a separation nip by abutting the feed roller 114, and separates a sheet by a frictional force by receiving input of a driving force in a direction against the sheet conveyance direction via a torque limiter.

The pickup roller 113, the feed roller 114, and the retard roller 115 function as a feeding unit that feeds sheets one by one. The feeding unit is not limited to this, and a feeding unit of a belt conveyance system that sucks air from the inside of a belt that is rotationally driven and conveys a recording material while attracting the recording material to the surface of the belt by suction may be used. In addition, the retard roller 115 is an example of a separation member that separates the sheet by frictional force, and a roller member supported via a torque limiter by a shaft fixed to the casing 100A or a separation pad that is a pad-shaped frictional member formed from an elastic material may be used as the separation member.

Pre-registration rollers 116 are a conveyance roller pair that convey sheets fed from the separation nip one by one. Registration rollers 118 are a conveyance roller pair that convey the sheet received from the pre-registration rollers 116 upstream thereof to the transfer portion of the image forming portion 100B. Post-fixation rollers 121 are a conveyance roller pair that convey the sheet having passed the fixing unit 110. Discharge rollers 122 are conveyance members (conveyance roller pair) that discharge the sheet received from the post-fixation rollers 121 to the outside of the casing 100A.

A plurality of sensors are provided along the sheet conveyance path in the image forming apparatus 100. A pre-registration sensor 117 detects the sheet having passed the pre-registration rollers 116. A registration sensor 119 detects the sheet having passed the registration rollers 118. A fixation sensor 120 detects the sheet having passed the fixing unit 110. That is, each sensor functions as a sheet detection portion configured to issue a detection signal that changes in accordance with passage of the sheet. As each sensor, a known element such as a sensor unit that is a combination of a flag projecting to the inside of the sheet conveyance path and a photo-interrupter that detects swing of the flag, or a photo-reflector that radiates light toward the conveyance path and detects reflection light from the sheet can be used. A control circuit of the image forming apparatus 100 that will be described later controls the sheet position in the sheet conveyance operation, and monitors sheet conveyance abnormality on the basis of the detection signal from each sensor. Examples of the sheet conveyance abnormality include jamming, delay, and early arrival.

An outline of an image forming operation performed by the image forming apparatus 100 will be described. When an instruction for execution of image formation, that is, a job is input to the image forming apparatus 100, sheets are fed one by one from the feed cassette 112 toward the image forming portion 100B. Specifically, driving of the feeding unit is started, and the uppermost sheet of a sheet bundle supported in the feed cassette 112 is sent out by the pickup roller 113, and is conveyed by the feed roller 114 while being separated from the other sheets in the separation nip. Then, the sheet is conveyed by the pre-registration rollers 116, and is conveyed to the transfer portion by the registration rollers 118. In doing so, as will be described later, the speed change timing of the registration rollers 118 is adjusted in accordance with a timing at which the sheet is detected by the registration sensor 119, and thus the sheet reaches the transfer portion at a timing synchronized with an image forming process of the image forming portion 100B.

In parallel with the feeding of the sheet, the image forming process of forming a toner image on the photosensitive drum 102 is performed in the image forming portion 100B. That is, when the job is started, the photosensitive drum 102 is rotationally driven, and the charging roller 107 uniformly charges the surface of the photosensitive drum 102. The semiconductor laser 103 emits laser light modulated in accordance with a signal based on the image information, that is, a video signal, and the surface of the photosensitive drum 102 is irradiated with the laser light by the optical system including the rotary polygon mirror 105. As a result of this, the surface of the photosensitive drum 102 is exposed in a scanning manner, and thus an electrostatic latent image corresponding to the image information is formed on the surface of the photosensitive drum 102. The developing roller 108 supplies toner to the photosensitive drum 102 by rotating while bearing toner, and thus visualizes, that is, develops the electrostatic latent image into a toner image. Then, a transfer voltage is applied to the transfer roller 109 in the transfer portion, and thus the toner image borne on the photosensitive drum 102 is transferred onto the sheet conveyed to the transfer portion.

While the sheet having passed the transfer portion is nipped and conveyed between the fixing roller 124 and the pressurizing roller 125 of the fixing unit 110, the toner image on the sheet is heated and pressurized. As a result of this, the toner image is fixed to the sheet. The sheet having passed the fixing unit 110 is conveyed via the post-fixation rollers 121, and is discharged onto a discharge tray 123 provided on an upper portion of the casing 100A by the discharge rollers 122.

The image forming apparatus 100 described above is merely an example, and for example, the present technique may be applied to an image forming apparatus including an electrophotographic mechanism of an intermediate transfer system as the image forming portion. In the intermediate transfer system, the toner image formed on the image bearing member is transferred to an intermediate transfer member such as an intermediate transfer belt through primary transfer, then the toner image is transferred from the intermediate transfer member onto the sheet through secondary transfer, and thus an image is formed on the sheet. In addition, the image forming apparatus may be an image forming apparatus that forms a color image on a sheet by forming toner images of different colors respectively on a plurality of image bearing members. In addition, the system of the image forming portion is not limited to the electrophotographic mechanism, and the image forming apparatus may include an image forming portion of a different system such as an image forming unit of an inkjet system or an offset printing mechanism.

Hardware Configuration Diagram

Figure 2:
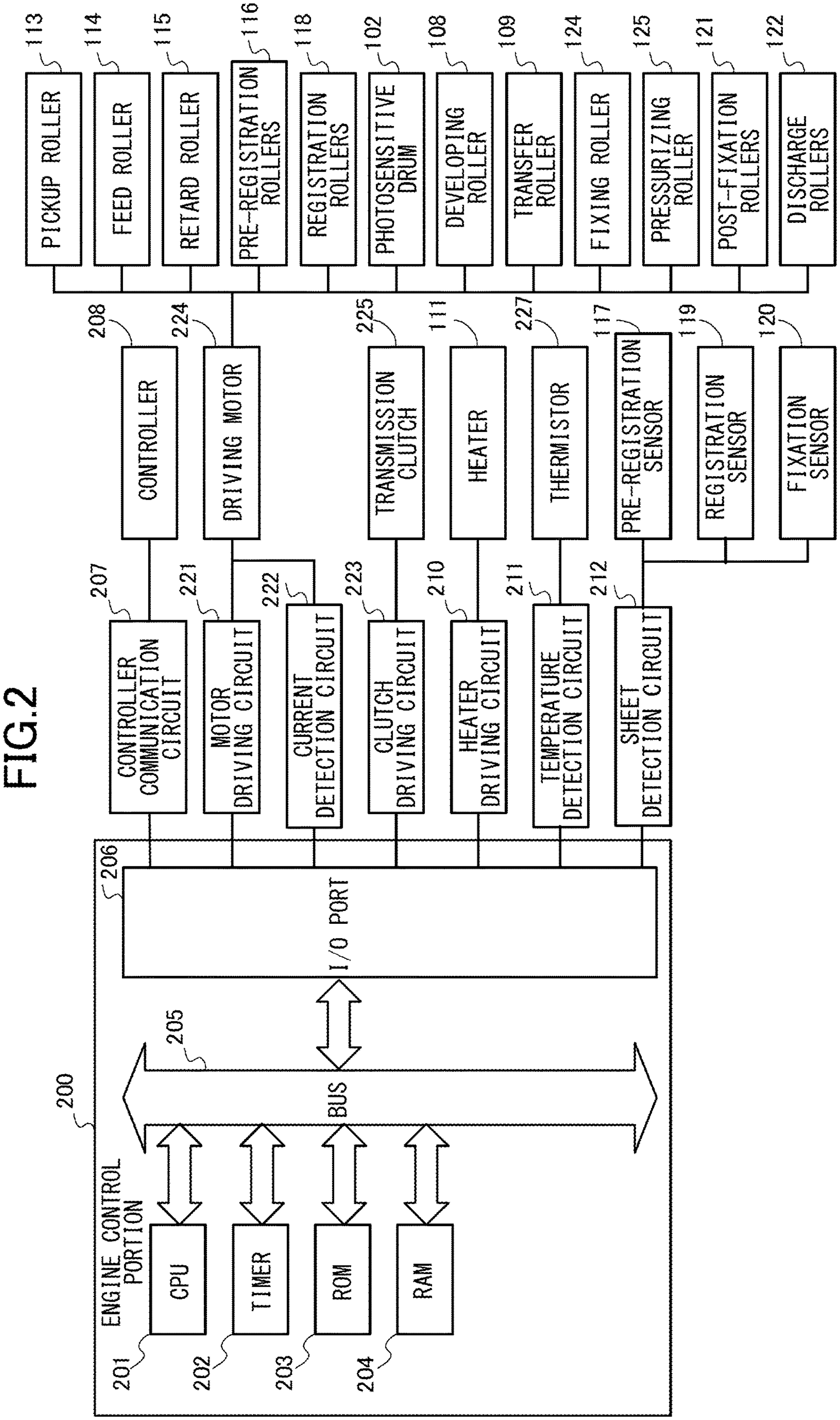
FIG. 2 is a diagram illustrating a hardware configuration of the image forming apparatus according to the first embodiment.

FIG. 2 illustrates a hardware configuration diagram for realizing the control of the present embodiment. The image forming apparatus 100 includes an engine control portion 200 that controls the image forming operation, and a controller 208 that gives an instruction to the engine control portion 200. The engine control portion 200 includes a central processing unit: CPU 201 that executes a program for controlling the image forming apparatus, a read-only memory: ROM 203 storing the program and data required for controlling the image forming apparatus, and a random access memory: RAM 204 that temporarily holds the data. The ROM 203 is an example of a non-transitory computer-readable storage medium storing a program. The CPU 201 is electrically connected to each unit, that is, each control target such as a motor and a sensor of the image forming apparatus 100 via a bus 205 and an input/output portion: I/O port 206, and is capable of giving a command to or receiving a signal from each unit.

The controller 208 gives an instruction such as a start command of the image forming operation, that is, a print instruction to the engine control portion 200 via a controller communication circuit 207 and the I/O port 206. The controller 208 and the engine control portion 200 constitute a control portion (control circuit) that controls the operation of the image forming apparatus 100.

The driving motor 224 generates a driving force used for driving the pickup roller 113, the feed roller 114, the retard roller 115, the pre-registration rollers 116, the registration rollers 118, the post-fixation rollers 121, and the discharge rollers 122. That is, the driving motor 224 is a single drive source that drives a plurality of conveyance portions disposed in the image forming apparatus 100. Further, the driving force of the driving motor 224 is also used for driving the photosensitive drum 102, the developing roller 108, the transfer roller 109, the fixing roller 124, and the pressurizing roller 125.

Since a configuration in which the image forming apparatus 100 includes only one driving motor 224 as a drive source is employed in the present embodiment, the size and cost of the image forming apparatus 100 are reduced. However, a motor that drives part of the conveyance portions, the photosensitive drum 102, or the like may be added as another drive source.

The driving motor 224 rotates on a current supplied from a motor driving circuit 221. The motor driving circuit 221 drives the driving motor 224 on the basis of a command from the engine control portion 200, and thus drives the pickup roller 113, the photosensitive drum 102, and the like described above.

In addition, a current detection circuit 222 is connected to a current supply circuit from the motor driving circuit 221 to the driving motor 224. The current detection circuit 222 is a circuit that detects the current flowing in the coil of the driving motor 224, and inputs a signal indicating the detected current value to the engine control portion 200.

A transmission clutch 225 operates on a current supplied (i.e., power supply) from a clutch driving circuit 223, and switches between a coupled state (engaged state) and a released state (disengaged state). The transmission clutch 225 is an actuator constituting part of a transmission mechanism 300 that will be described later. The clutch driving circuit 223 switches the coupled state and the released state of the transmission clutch 225 on the basis of a command from the engine control portion 200, and is thus capable of changing the driving speed of the feed roller 114, the retard roller 115, and the pre-registration rollers 116. As the transmission clutch 225, for example, an electromagnetic clutch is used.

The heater 111 of the fixing unit 110 receives power from a heater driving circuit 210, and thus generates heat. The heater driving circuit 210 controls, on the basis of a command from the engine control portion 200, the amount of current supplied to the heater 111. The fixing unit 110 is provided with a thermistor 227 that detects the surface temperature of the fixing roller 124, and a temperature detection circuit 211 inputs temperature information corresponding to the signal detected by the thermistor 227 to the engine control portion 200. The engine control portion 200 issues a command to the heater driving circuit 210 on the basis of the temperature information input from the temperature detection circuit 211, and thus performs control to maintain the fixing roller 124 at a predetermined target temperature suitable for fixation of an image.

The sheet detection circuit 212 obtains detection signals of the pre-registration sensor 117, the registration sensor 119, and the fixation sensor 120 on the sheet conveyance path, and inputs sheet presence/absence information to the engine control portion 200.

Transmission Mechanism

Figure 3A:
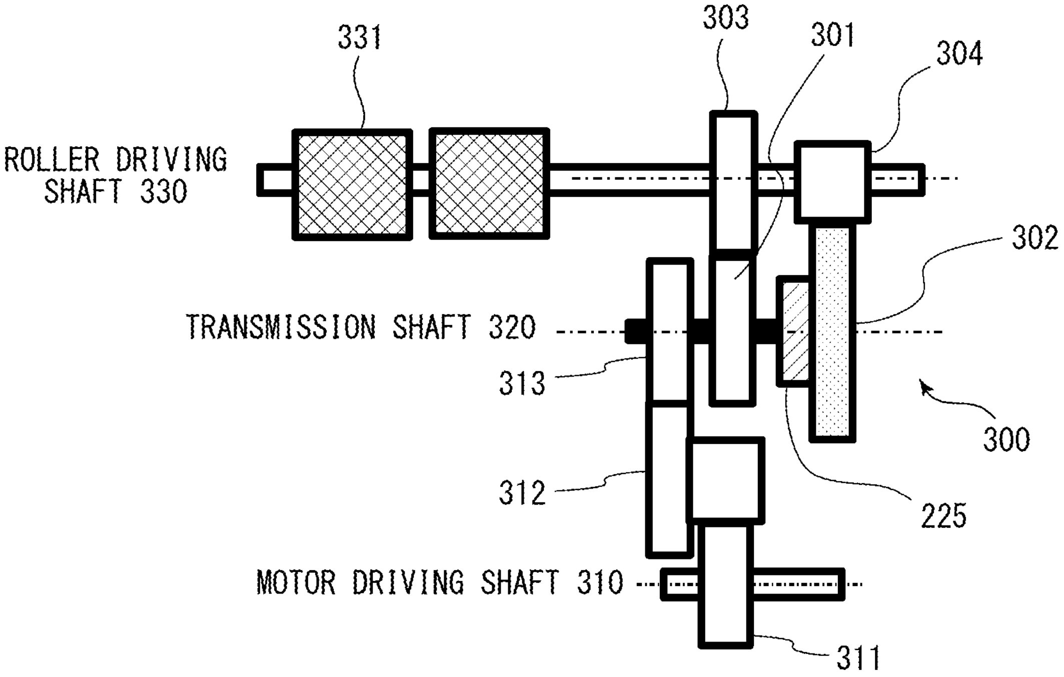
FIGS. 3A and 3B are each a schematic diagram illustrating a transmission mechanism according to the first embodiment.
Figure 3B:
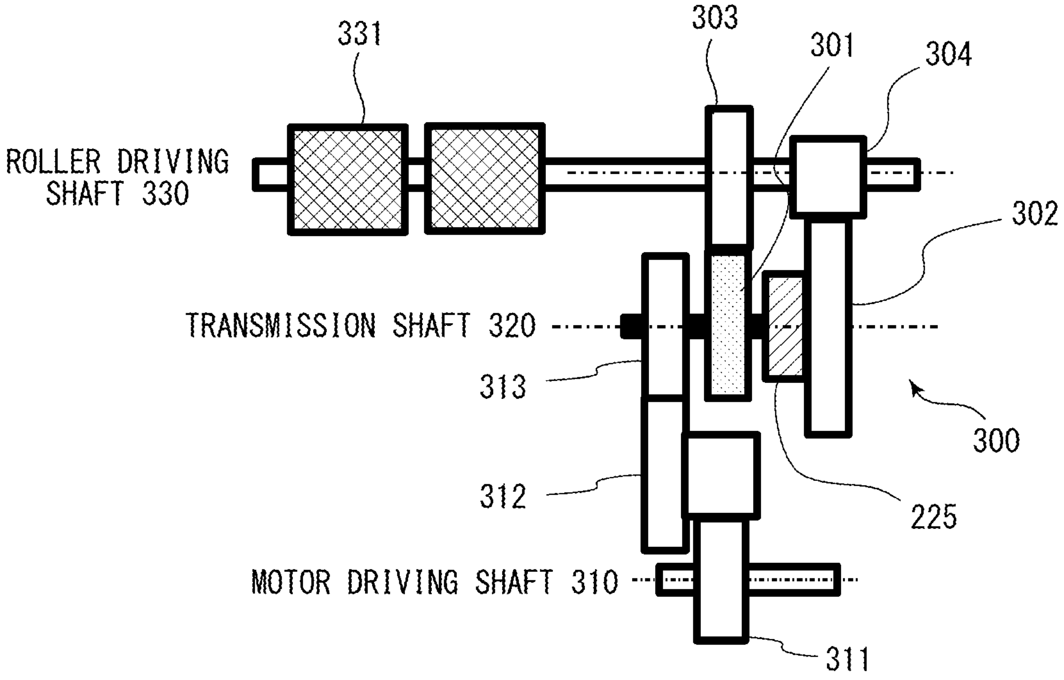

A configuration example of the transmission mechanism 300 of the present embodiment will be described with reference to schematic diagrams of FIGS. 3A and 3B. FIGS. 3A and 3B schematically illustrate a drive train from the driving motor 224 to a conveyance roller 331 serving as a drive target including the transmission mechanism 300. Here, the conveyance roller 331 serving as a drive target is any one of the feed roller 114, the retard roller 115, and the pre-registration rollers 116 in the present embodiment.

FIG. 3A illustrates a state in which the conveyance roller 331 is driven at a first speed V1 higher than a process speed of the image forming portion 100B, which is the peripheral speed of the photosensitive drum 102 also referred to as an image forming speed. This state will be referred to as an accelerated state. FIG. 3B illustrates a state in which the conveyance roller 331 is driven at a second speed V2 equal to the process speed, which is lower (slower) than the first speed V1. This state will be referred to as a regular speed state. The first speed V1 and the second speed V2 each represent a peripheral speed of the conveyance roller 331. The accelerated state of FIG. 3A serves as a first state of the present embodiment, and the regular speed state of FIG. 3B serves as a second state of the present embodiment.

The drive train from the driving motor 224 to the conveyance roller 331 serving as a drive target includes an output gear 311, a step gear 312, a transmission input gear 313, a transmission clutch 225, a regular speed gear 301, an acceleration gear 302, a regular speed output gear 303, and an acceleration output gear 304. The transmission mechanism 300 is constituted by the transmission input gear 313, the transmission clutch 225, the regular speed gear 301, the acceleration gear 302, the regular speed output gear 303, and the acceleration output gear 304.

The output gear 311 is disposed on an output shaft 310 of the driving motor 224. The output gear 311 is engaged with the transmission input gear 313 on a transmission shaft 320 via the step gear 312 for deceleration. The transmission clutch 225, the regular speed gear 301, and the acceleration gear 302 are disposed coaxially with the transmission shaft 320. The transmission clutch 225 is interposed between the transmission shaft 320 that is a member on the input side and the acceleration gear 302 that is a member on the output side, and couples and releases the transmission shaft 320 and the acceleration gear 302. That is, when the transmission clutch 225 is in the coupled state, the acceleration gear 302 rotates integrally with the transmission input gear 313, and when the transmission clutch 225 is in the released state, relative rotation of the acceleration gear 302 with respect to the transmission input gear 313 is permitted. In contrast, the regular speed gear 301 is always coupled to the transmission input gear 313 via the transmission shaft 320, and integrally rotates with the transmission input gear 313 even in the released state of the transmission clutch 225.

The regular speed output gear 303 and the acceleration output gear 304 are disposed on a roller driving shaft 330 of the conveyance roller 331. The regular speed output gear 303 is engaged with the regular speed gear 301 on the transmission shaft 320, and the acceleration output gear 304 is engaged with the acceleration gear 302 on the transmission shaft 320.

The gear ratio of the acceleration gear 302 and the acceleration output gear 304 serving as a first gear train is different from the gear ratio of the regular speed gear 301 and the regular speed output gear 303 serving as a second gear train, and the driving speed of the conveyance roller 331 differs between the accelerated state and the regular speed state due to the difference in the gear ratio. That is, the transmission mechanism 300 is switchable between the accelerated state serving as a first state in which the driving force input from the drive source is transmitted to the conveyance portion at a first transmission ratio and the regular speed state serving as a second state in which the driving force input from the drive source is transmitted to the conveyance portion at a transmission ratio (second transmission ratio) different from the first state.

In the present embodiment, the driving speed of the conveyance roller 331 in the accelerated state is set to 1.5 times of the driving speed of the conveyance roller 331 in the regular speed state, that is, the process speed. That is, in the accelerated state, the sheet conveyance speed of the feed roller 114 and the pre-registration rollers 116 is higher than the process speed. Therefore, as will be described later, the transmission mechanism 300 is configured to be switched to the regular speed state after starting feeding the sheet in the accelerated state, and the position of the sheet in the sheet conveyance operation is adjusted by adjusting the speed change timing thereof.

In the drive train having the configuration described above, the rotation of the driving motor 224 is transmitted to the transmission input gear 313 via the output gear 311 and the step gear 312, and thus the driving force is input to the transmission mechanism 300. In the case where the transmission clutch 225 is in the coupled state as illustrated in FIG. 3A, the rotation of the transmission input gear 313 is transmitted to the acceleration gear 302 via the transmission clutch 225, and is input to the roller driving shaft 330 via the engagement between the acceleration gear 302 and the acceleration output gear 304. That is, the transmission mechanism 300 is in the accelerated state. In contrast, in the case where the transmission clutch 225 is in the released state, the rotation of the transmission input gear 313 is input to the roller driving shaft 330 via the engagement between the regular speed gear 301 and the regular speed output gear 303. That is, the transmission mechanism 300 is in the regular speed state.

To be noted, for example, a one-way clutch that permits idling, that is, relative rotation of the regular speed gear 301 with respect to the transmission shaft 320 is provided such that locking caused by engagement between the regular speed gear 301 and the regular speed output gear 303 does not occur in the accelerated state. As a result of this, accompanied by high-speed rotation of the regular speed output gear 303 on the roller driving shaft 330 in the accelerated state, the regular speed gear 301 rotates freely with respect to the transmission shaft 320 while sliding the one-way clutch on the transmission shaft 320. Instead of this, a one-way clutch that permits freewheeling, that is, relative rotation of the regular speed output gear 303 with respect to the roller driving shaft 330 may be provided.

Modification Examples of Transmission Mechanism

The transmission mechanism 300 described above is an example of a transmission mechanism that switches the transmission ratio of drive transmission from the drive source to the conveyance portion by mechanical operation on the basis of a command from the engine control portion 200. As a different transmission mechanism, for example, a configuration in which the accelerated state is switched to the regular speed state by switching the transmission clutch 225 from the released state to the coupled state may be employed. Specifically, the arrangement of the regular speed gear 301 and the regular speed output gear 303 and the arrangement of the acceleration gear 302 and the acceleration output gear 304 may be switched in FIGS. 3A and 3B.

As another modification example, a configuration in which the regular speed gear 301 and the acceleration gear 302 are supported on the transmission shaft 320 so as to be relatively rotatable and a sleeve serving as a slide member that is not relatively rotatable with respect to the transmission shaft 320 and slidable on the transmission shaft 320 in the axial direction is provided may be employed. In this case, the speed change is realized by moving the sleeve by a solenoid serving as an actuator and thus engaging the sleeve with the regular speed gear 301 or the acceleration gear 302.

As yet another modification example, a configuration in which two electromagnetic clutches serving as actuators are provided such that drive transmission to the regular speed gear 301 and drive transmission to the acceleration gear 302 can be independently coupled or released may be employed. In this case, the speed change is realized by switching which of the two electromagnetic clutches is switched to the coupled state if the transmission shaft 320 and the regular speed gear 301 are connected via one of the electromagnetic clutches and the transmission shaft 320 and the acceleration gear 302 are connected via the other of the electromagnetic clutches.

As still another modification example, a transmission mechanism that is a combination of a planetary gear mechanism and one or more electromagnetic clutches may be used. In this case, rotation of the driving motor 224 is input to one of rotation elements including a sun gear, a planetary carrier, and an internal gear, and the rotation is output to the roller driving shaft 330 from another of the rotation elements. Then, the speed change is realized by controlling the coupling and release between the rotation elements and a fixed member by the electromagnetic clutch.

The configuration is not limited to the examples described above, and a transmission mechanism including an actuator that operates on the basis of a command from the engine control portion 200, and configured such that a path through which the driving force is actually transmitted is switched among a plurality of drive transmission paths by the operation of the actuator may be used.

Control Block Diagram

A system configuration of the present embodiment will be described with reference to a block diagram of FIG. 4. As described above, the image forming apparatus 100 includes the controller 208 and the engine control portion 200 that are mutually communicably connected. The controller 208 is communicably connected to an external host computer. The engine control portion 200 includes a conveyance control portion 403, an image formation control portion 404, a motor control portion 405, a current detection portion 406, a sheet detection portion 407, and a clutch control portion 409. The image formation control portion 404 includes a clutch timing adjusting portion 408.

These functions of the engine control portion 200 may be each realized by an application specific integrated circuit: ASIC or the like, and may be realized as a function of a program executed by the CPU 201. The conveyance control portion 403 and the image formation control portion 404 are realized by, for example, processing of a program executed by the CPU 201 illustrated in FIG. 2. The motor control portion 405 is realized by, for example, the motor driving circuit 221 illustrated in FIG. 2 and processing related to control of the motor driving circuit 221 of the program executed by the CPU 201. The current detection portion 406 is realized by, for example, the current detection circuit 222 illustrated in FIG. 2 and processing related to control of the current detection circuit 222 of the program executed by the CPU 201. The sheet detection portion 407 is realized by, for example, the sheet detection circuit 212 illustrated in FIG. 2, and processing related to control of the sheet detection circuit 212 of the program executed by the CPU 201. The clutch control portion 409 is realized by, for example, the clutch driving circuit 223 illustrated in FIG. 2 and processing related to control of the clutch driving circuit 223 of the program executed by the CPU 201.

When the controller 208 receives a job from a host computer, the controller 208 analyzes the received job, and transmits a print instruction to the engine control portion 200 on the basis of the analysis result. The engine control portion 200 executes an image forming operation, and a preparation operation and an ending operation accompanied by the image forming operation, on the basis of the print instruction from the controller 208. In doing so, the image formation control portion 404 designates an operation performed by the motor control portion 405 and the conveyance control portion 403, on the basis of the print instruction.

The motor control portion 405 rotates the driving motor 224 on the basis of a drive instruction from the image formation control portion 404, and transmits a current driving state of the driving motor 224 to the image formation control portion 404. The current detection portion 406 detects a motor current flowing in the driving motor 224, and inputs a detected value of the motor current to the clutch timing adjusting portion 408 of the image formation control portion 404. In the present embodiment, the current detection portion 406 functions as a load detection portion that detects a load acting on the driving motor 224.

The clutch timing adjusting portion 408 calculates clutch timing information from change in the motor current when speed change of the transmission mechanism 300 described above is performed by operating the transmission clutch 225 while the driving motor 224 is rotating. The clutch timing information is information about a delay time from when the engine control portion 200, that is, the clutch control portion 409 issues a signal for operating the transmission clutch 225 to switch the transmission mechanism 300 from one of the regular speed state and the accelerated state to the other to when the transmission mechanism 300 actually switches from the one to the other of the regular speed state and the accelerated state. Calculation of the clutch timing information will be described in detail later.

The conveyance control portion 403 starts the sheet conveyance operation in the case of receiving, from the image formation control portion 404, an instruction indicating that feeding is possible. This instruction serves as a feed permission. That is, the conveyance control portion 403 having received the feed permission causes the pickup roller 113 to start feeding the sheet by an unillustrated starting portion in a state in which the driving motor 224 is rotating. The starting portion is, for example, a solenoid or the like that moves the pickup roller 113 from a standby position where the pickup roller 113 is separated upward from the uppermost sheet in the feed cassette 112 to an abutting position where the pickup roller 113 abuts the uppermost sheet.

In addition, the conveyance control portion 403 instructs the clutch control portion 409 to issue a control signal that switches the transmission clutch 225 between the coupled state and the released state. The control signal is a clutch ON signal or a clutch OFF signal. To be noted, in the case of operating the transmission clutch 225 for obtaining the clutch timing information during execution of the preparation operation that will be described later, the clutch timing adjusting portion 408 gives a similar instruction to the clutch control portion 409.

Also after the sheet conveyance operation is started, the conveyance control portion 403 monitors the detection signal of each of the sensors 117, 119, and 120 via the sheet detection portion 407 and obtains the conveyance status of the sheet. In accordance with the obtained conveyance status, the conveyance control portion 403 adjusts the conveyance position of the sheet in the sheet conveyance operation, and detects occurrence of a jam, discharge to the outside of the apparatus, and the like. The conveyance control portion 403 transmits information indicating the conveyance status of the sheet such as occurrence of a jam, normal discharge of the sheet, or the like to the image formation control portion 404. This information will be referred to as conveyance information. The image formation control portion 404 determines whether or not the sheet conveyance operation is normally performed on the basis of the conveyance information received from the conveyance control portion 403, and executes processing to stop the image forming operation in the case where, for example, a jam has occurred.

Adjustment of the sheet position in the sheet conveyance operation is adjustment of the speed change timing of the transmission mechanism 300 such that the variation of the time from the start of the sheet conveyance apparatus to the arrival of the leading end of the sheet at a detection position of the registration sensor 119 is reduced.

In the sheet conveyance operation, time from when the feeding of the sheet is started to when the sheet passes a predetermined position on the sheet conveyance path varies due to various factors such as deviation of the set position of the sheet in the feed cassette 112, the wear state of the pickup roller 113, and the like. That is, in each time point in the sheet conveyance operation, the actual position of the leading end of the sheet is displaced forward or backward from the ideal position of the leading end of the sheet. Therefore, the displacement of the sheet position is corrected in accordance with whether the timing at which the pre-registration sensor 117 has detected the leading end of the sheet is earlier or later than expectation by using the time point at which the sheet conveyance operation is started as a standard.

Specifically, in the present embodiment, after the sheet conveyance operation is started in a state in which the transmission mechanism 300 is in the accelerated state, the speed change control of switching the transmission mechanism 300 to the regular speed state before the leading end of the sheet reaches the registration sensor 119 is executed. In the speed change control, the timing of the speed change is adjusted in accordance with whether or not the timing at which the pre-registration sensor 117 has detected the leading end of the sheet is earlier or later than the expectation, and thus control is performed such that the leading end of the sheet reaches the registration sensor 119 at a predetermined timing. As a result of this, the toner image formed by the image forming portion 100B and the conveyed sheet are aligned in the sheet conveyance direction serving as a sub-scanning direction, and thus an image can be formed at an accurate position on the sheet.

In addition, in the case of successively performing image formation on a plurality of sheets, the intervals between sheets passing the transfer portion can be kept constant by adjusting the timing of the speed change in accordance with the timing at which the pre-registration sensor 117 has detected the leading end of the succeeding sheet as described above. This interval will be referred to as a sheet interval. Therefore, appropriately controlling the speed change timing of the transmission mechanism 300 also contributes to improvement in the productivity of the image forming apparatus 100. An example of the productivity is a throughput, which is the number of images output per unit time.

Variation of Delay in Speed Change

Incidentally, a delay time occurs between when the engine control portion 200 issues a command to change the speed to switch the transmission mechanism 300 from the accelerated state to the regular speed state or from the regular speed state to the accelerated state and when the state of the transmission mechanism 300 is actually switched. This delay time includes a response time of operation of the transmission clutch 225 having received the command from the engine control portion 200, and a mechanical response delay that occurs after the operation of the transmission clutch 225. The mechanical response delay refers to, for example, a slight delay of abutment between tooth surfaces caused by backlash between the regular speed gear 301 and the regular speed output gear 303 that occurs when the transmission mechanism 300 switches from the accelerated state illustrated in FIG. 3A to the regular speed state illustrated in FIG. 3B. Also in the case where the transmission mechanism 300 has a configuration different from that illustrated in FIGS. 3A and 3B, a delay time including the response time of the actuator and a mechanical response delay caused by switching of the drive transmission path in the transmission mechanism 300 after the operation of the actuator occurs.

In the case of changing the speed change timing of the transmission mechanism 300 in accordance with the timing at which the pre-registration sensor 117 has detected the leading end of the sheet in the sheet conveyance operation during image formation, setting the speed change timing in consideration of the delay time described above can be considered. As a result of this, the sheet moving further forward than the ideal sheet position during the delay time can be suppressed.

However, the response time of the transmission clutch 225 and the mechanical response delay of the transmission mechanism 300 vary between individual products due to factors such as the manufacturing tolerance, assembly tolerance, and the like of the members. That is, there is individual difference. Therefore, even if the speed change timing is set in consideration of an average delay time, since the delay time varies for each individual product, there is a possibility that the sheet position after the acceleration of the transmission mechanism 300 is displaced forward or backward from the ideal sheet position. That is, in the case of an individual product whose delay time is long, the accelerated state of the transmission mechanism 300 continues longer than expected, and thus the sheet is displaced forward from the ideal sheet position in the state after the acceleration. Conversely, in the case of an individual product whose delay time is short, the accelerated state of the transmission mechanism 300 ends earlier than expected, and thus the sheet is displaced backward from the ideal sheet position in the state after the acceleration.

Further, in addition to the variation between individual products, that is, individual difference, the delay time also varies in one individual product due to various factors such as wear of members constituting the transmission mechanism 300, and friction coefficients between members and expansion and contraction of members depending on environmental conditions such as the temperature and the humidity.

Estimation of Delay Time from Motor Current

Therefore, in the present embodiment, change in the current flowing in the driving motor 224, that is, the motor current, that occurs in the speed change of the transmission mechanism 300 is monitored, and thus the delay time in the current transmission mechanism 300 is more accurately estimated. An estimation method for the delay time using the motor current will be described below.

Figure 4:
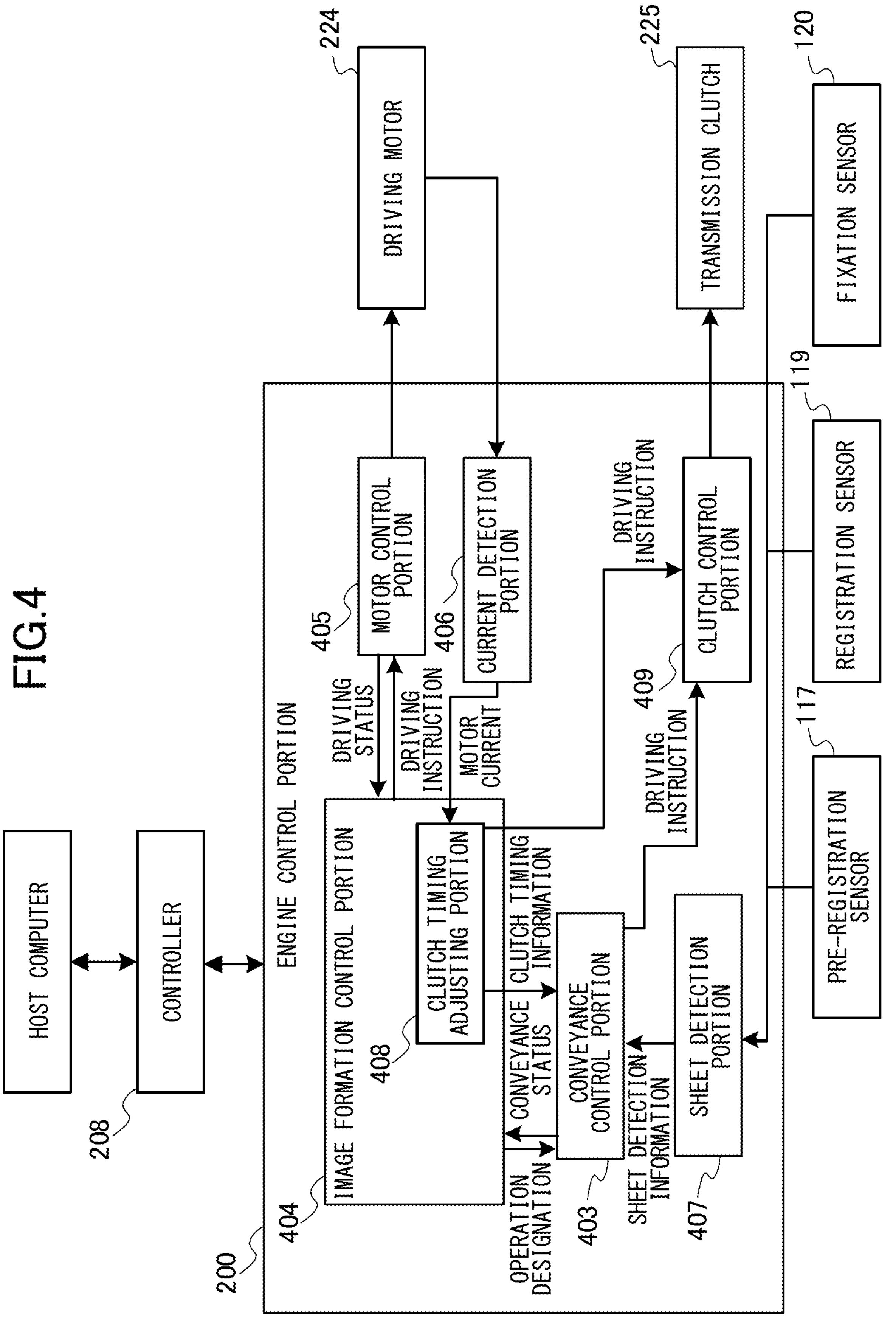
FIG. 4 is a diagram illustrating a system configuration of the image forming apparatus according to the first embodiment.
Figure 5:
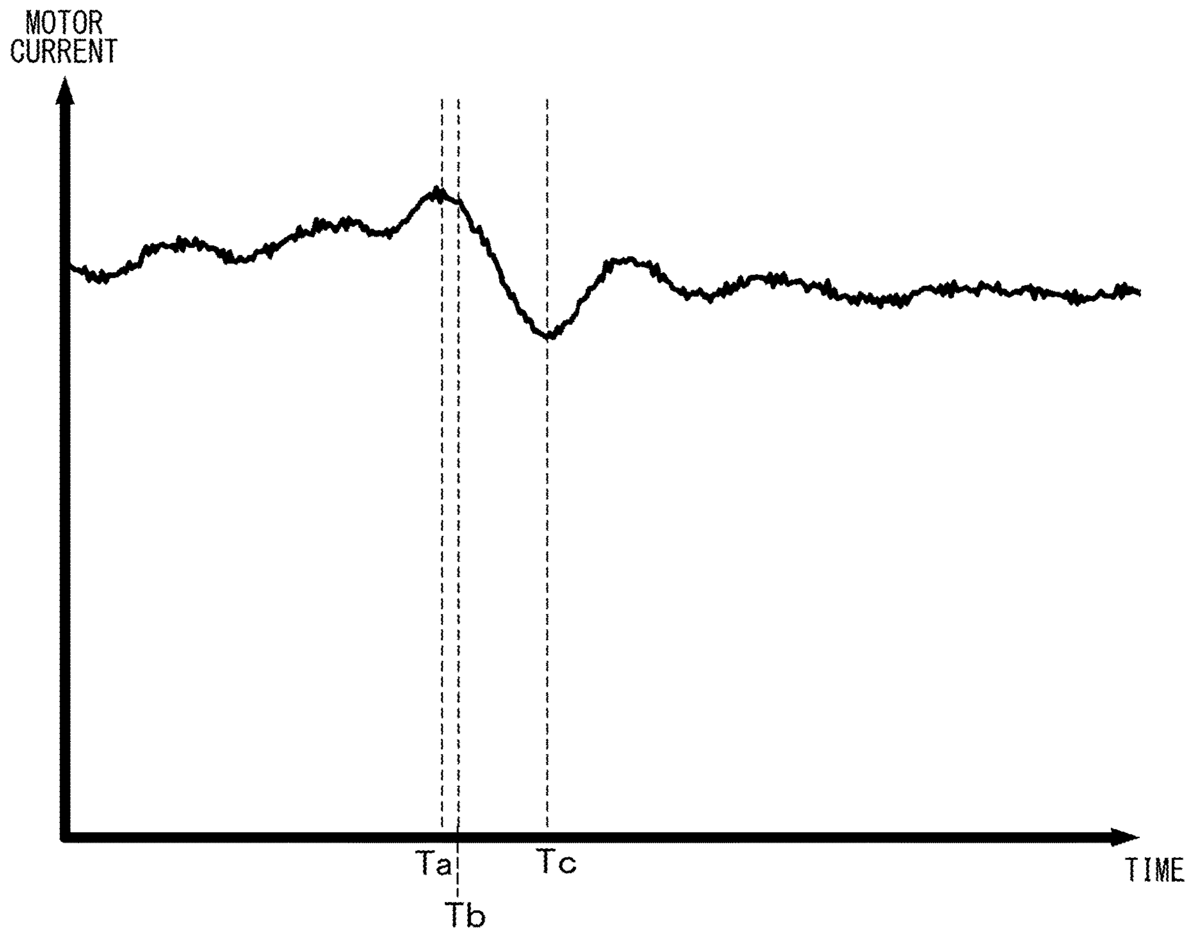
FIG. 5 is a graph illustrating a change in a motor current during speed change of the transmission mechanism according to the first embodiment.

FIG. 5 illustrates a graph showing the change in the motor current detected by the current detection circuit 222 illustrated in FIG. 2 or the current detection portion illustrated in FIG. 4 when speed change is performed to switch the transmission mechanism 300 from the accelerated state illustrated in FIG. 3A to the regular speed state illustrated in FIG. 3B.

In FIG. 5, a time point Ta represents a timing at which a control signal serving as a clutch OFF signal for switching the transmission clutch 225 from the coupled state to the released state is output. A time point Tb represents a timing at which the transmission clutch 225 is switched from the coupled state to the released state in accordance with the control signal. A time point Tc represents a timing at which switching from the accelerated state of FIG. 3A where the driving force is transmitted via the engagement between the acceleration gear 302 and the acceleration output gear 304 to the regular speed state of FIG. 3B where the driving force is transmitted via the engagement between the regular speed gear 301 and the regular speed output gear 303 is completed.

The time from the time point Ta to the time point Tb corresponds to the response time of the transmission clutch 225. The time from the time point Tb to the time point Tc corresponds to the mechanical response delay caused by switching of the drive transmission path in the transmission mechanism 300 after the operation of the transmission clutch 225.

In the present embodiment, in the period from the time point Tb to the time point Tc, the backlash between the regular speed gear 301 and the regular speed output gear 303 still remains and the tooth surfaces are not engaged with each other. That is, the period from the time point Tb to the time point Tc is a very short period in which drive coupling between the input side, that is, the driving motor side, and the output side, that is, the conveyance roller side, of the transmission mechanism 300 is temporarily cancelled. Therefore, in the period from the time point Tb to the time point Tc, the driving load acting on the driving motor 224 temporarily decreases. As a result, as illustrated in FIG. 5, the decrease in the driving load appears as decrease in the motor current in the period from the time point Tb to the time point Tc.

That is, in the case where the change in the motor current illustrated in FIG. 5 is obtained in the present embodiment, a timing at which the inclination of the decrease in the motor current has become equal to or larger than a predetermined value and which is after the time point Ta when the control signal serving as the clutch OFF signal for the transmission clutch 225 is issued can be set as the time point Tb. In addition, a timing which is later than the time point Tb and at which the motor current switches from a decrease trend to an increase trend, that is, a timing at which the motor current reaches a local minimum value can be set as the time point Tc. In other words, when the curve of the motor current from when the clutch OFF signal is issued to when the motor current reaches the local minimum value, that is, from the time point Ta to the time point Tc is approximated using first line segments whose current values are approximately constant and second line segments that are continuous with the first line segments and whose current values linearly decrease, the critical point thereof can be set as the time point Tb. Therefore, the time point Tb can be referred to as a time point when the motor current starts decreasing after the clutch OFF signal.

The clutch timing adjusting portion 408 described above and illustrated in FIG. 4 obtains the motor current in the case where the control signal serving as the clutch OFF signal is issued to the transmission clutch 225 while the driving motor 224 is rotating, and specifies the time points Tb and Tc from the change in the motor current by the method described above. Then, the clutch timing adjusting portion 408 transmits the clutch response time (first response time from Ta to Tb) of the transmission clutch 225 and a gear change time (second response time from Tb to Tc) representing the mechanical response delay of the transmission mechanism 300 to the conveyance control portion 403 as clutch timing information.

Although the timing at which the driving load is temporarily reduced by the backlash between gears and the motor current reaches a local minimum value is regarded as a speed change completion time point of the transmission mechanism 300 here, the estimation method for the speed change completion time point may be changed in accordance with the specific configuration of the transmission mechanism.

To be noted, also in the case of a configuration described as a modification example of the transmission mechanism, the temporary decrease in the driving load occurs similarly to the present embodiment in the case where a period in which the drive coupling between the input side and the output side of the transmission mechanism is temporarily cancelled is present in speed change of the transmission mechanism. Therefore, the time from when the control signal is issued to the actuator for speed change to when the motor current reaches the local minimum value can be treated as the delay time.

In addition, although the estimation method for the delay time in the speed change of the transmission mechanism 300 from the accelerated state to the regular speed state has been described herein, the delay time in the speed change from the regular speed state to the accelerated state can be also estimated. In this case, when a control signal serving as a clutch ON signal for switching the transmission clutch 225 to the coupled state for speed change from the regular speed state to the accelerated state is issued, since the load on the acceleration gear 302 is connected to the driving motor 224 via the transmission clutch 225, the motor current temporarily increases. Then, the motor current decreases because the driving load temporarily decreases until the backlash between the acceleration gear 302 and the acceleration output gear 304 is cancelled, and the motor current starts increasing when the tooth surfaces engage with each other. Therefore, the delay time from the clutch ON signal can be calculated by regarding the timing at which the motor current stops decreasing and starts increasing as a time point when the speed change from the regular speed state to the accelerated state is completed.

Obtaining Method for Clutch Timing Information

An obtaining method for the clutch timing information will be described. In the present embodiment, the clutch timing adjusting portion 408 obtains the clutch timing information while a preparation operation for the image forming operation performed in the case where an execution instruction (job) of image formation is input to the image forming apparatus 100 is executed. The preparation operation is an operation in which, as preparation for the image forming operation, rotation of the photosensitive drum 102 is started, and activation and adjustment of various voltages, pre-heating of the heater 111 in the fixing unit 110, and the like are performed. In the preparation operation, the sheet conveyance operation for conveying a sheet to be subjected to image formation is not performed.

Figure 6:
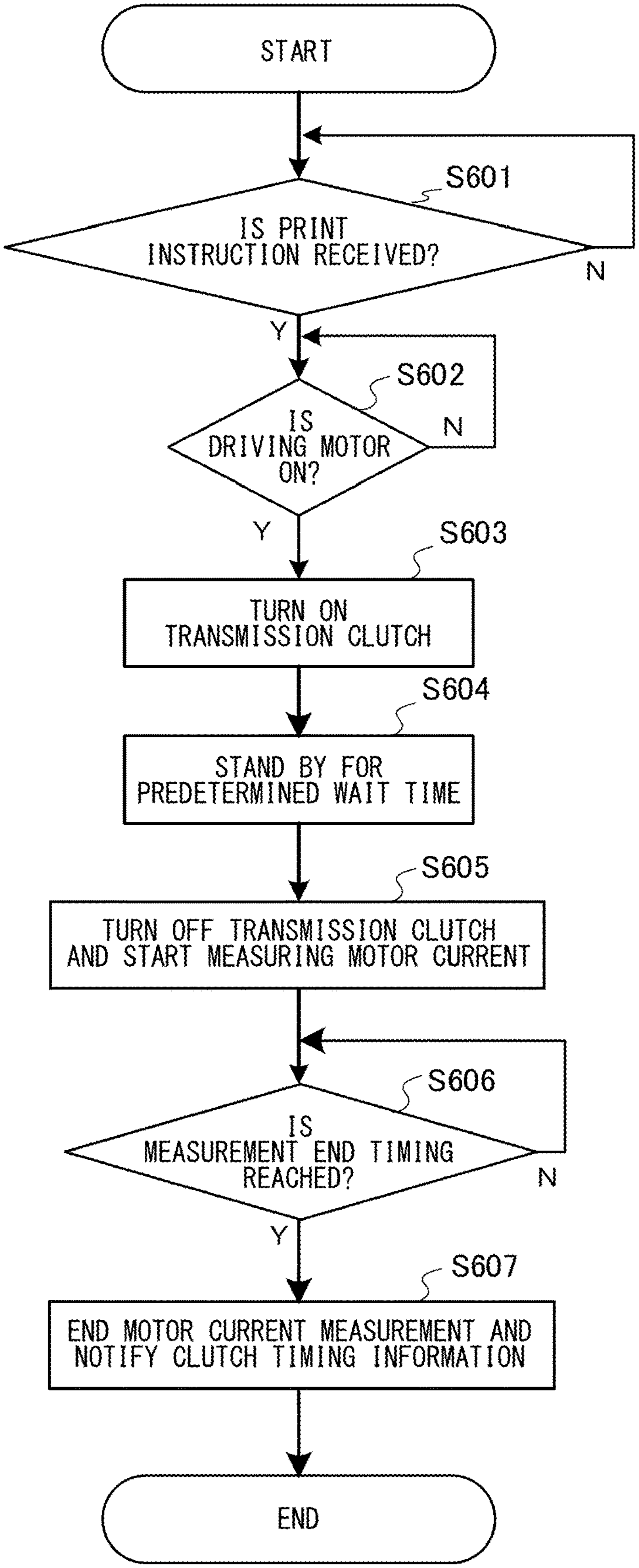
FIG. 6 is a flowchart illustrating an obtaining method for clutch timing information according to the first embodiment.

FIG. 6 illustrates the processing executed by the clutch timing adjusting portion 408 while the preparation operation is executed. In step S601, the clutch timing adjusting portion 408 determines whether or not the image formation control portion 404 has received the print instruction, and in the case where it has been determined that the print instruction has been received, the clutch timing adjusting portion 408 stands by in step S602 until the rotation of the driving motor 224 is started by the image formation control portion 404. After the rotation of the driving motor 224 is started, the clutch timing adjusting portion 408 instructs the clutch control portion 409 to issue the control signal serving as the clutch ON signal for switching the transmission clutch 225 to the coupled state in step S603. Then, in step S604, the clutch timing adjusting portion 408 stands by for a wait time that is preset as a time sufficient for the transmission clutch 225 to switch to the coupled state and for the transmission mechanism 300 to switch to the accelerated state illustrated in FIG. 3A.

After the elapse of the wait time, in step S605, the clutch timing adjusting portion 408 instructs the clutch control portion 409 to issue the control signal serving as the clutch OFF signal for switching the transmission clutch 225 to the released state while the rotation of the driving motor 224 is continuing. In addition, in step S605, the clutch timing adjusting portion 408 starts measuring the motor current detected by the current detection portion 406. Then, in step S606, the clutch timing adjusting portion 408 continues measurement of the motor current for a time that is preset as a time sufficient for the transmission clutch 225 to switch to the released state and for the transmission mechanism 300 to switch to the regular speed state illustrated in FIG. 3B.

After the elapse of the time described above and a measurement end timing for the motor current is reached, the clutch timing adjusting portion 408 finishes the measurement of the motor current, and notifies the image formation control portion 404 of the end of the measurement in step S607. In addition, the clutch timing adjusting portion 408 notifies the conveyance control portion 403 of the clutch response time (first response time from Ta to Tb) and the gear change time (second response time from Tb to Tc) that are estimated by the estimation method with reference to FIG. 5 as a measurement result and as clutch timing information.

To be noted, although description has been given assuming that the clutch timing information is obtained while the preparation operation for the image forming operation is executed, the clutch timing information may be obtained in a different period. For example, the clutch timing information may be obtained by processing similar to steps S602 to S607 while the preparation operation is executed when power of the image forming apparatus 100 is turned on. In addition, the clutch timing information may be obtained by processing similar to steps S602 to S607 in the case where an instruction to adjust the image formation conditions is received from an operation on an operation portion of the image forming apparatus 100 or received from an external computer.

In addition, while a job for successively forming images on a plurality of sheets, the clutch timing information may be obtained from the detection result of the motor current when the speed change of the transmission mechanism is performed during the sheet conveyance operation of a preceding sheet, and the obtained clutch timing information may be applied to the sheet conveyance operation of a succeeding sheet. In addition, as adjustment before shipping and after the assembly of the image forming apparatus 100, the clutch timing information may be obtained by processing similar to steps S602 to S607, and the obtained clutch timing information may be stored in a nonvolatile memory of the image forming apparatus 100.

Sheet Conveyance Adjustment in Feeding

Figure 7:
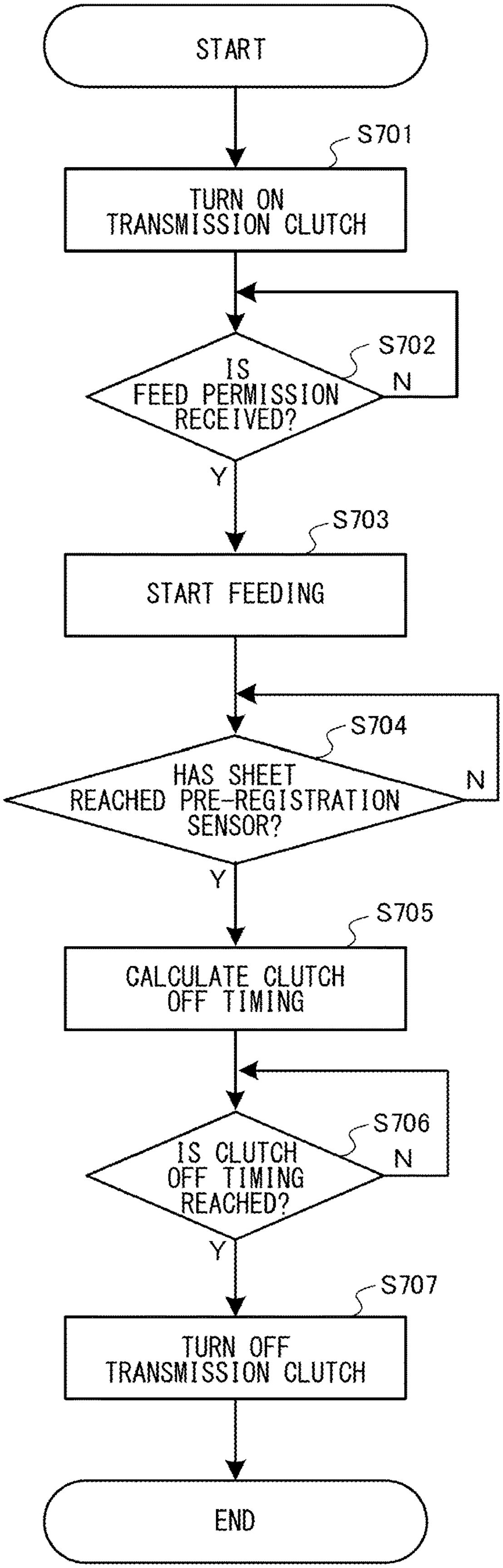
FIG. 7 is a flowchart illustrating a control method for a sheet conveyance operation according to the first embodiment.

A method for adjusting the sheet position in the sheet conveyance operation by using the clutch timing information will be described with reference to FIG. 7. The flow of FIG. 7 is executed by the conveyance control portion 403 on the basis of an instruction from the image formation control portion 404 illustrated in FIG. 4 in the case where an instruction to execute the image formation, that is, a job is input to the image forming apparatus 100.

In step S701, first, after the preparation operation and before the issue of the feed permission, the conveyance control portion 403 instructs the clutch control portion 409 to issue a control signal serving as a clutch ON signal for switching the transmission clutch 225 to the coupled state in advance. It is assumed that the driving motor 224 has been continuously rotating from the preparation operation. As a result of this, the feed roller 114, the retard roller 115, and the pre-registration rollers 116 are driven via the transmission mechanism 300 in the accelerated state.

When the feed permission is issued from the image formation control portion 404 in step S702, the conveyance control portion 403 starts the feeding of the sheet by the pickup roller 113 by the unillustrated starting portion in step S703. Here, the feed start timing of the sheet is set such that the sheet does not reach the pre-registration sensor 117 before an ideal arrival timing even in the case where there is a variation caused by the wear state of the pickup roller 113, the set position of the sheet, and the like. The ideal arrival timing is a timing at which the leading end of the sheet passes the pre-registration sensor 117 and is calculated backward from a target time point at which the leading end of the sheet is supposed to reach the transfer portion assuming that the sheet conveyance speed is constant at the process speed. This is because the method of adjusting the sheet position by controlling the timing at which the speed change of the transmission mechanism 300 from the accelerated state to the regular speed state in a single motor configuration is employed, and therefore it is difficult to correct early arrival while delayed arrival of the sheet can be corrected.

After the feeding of the sheet is started, the conveyance control portion 403 stands by in step S704 until the leading end of the sheet is detected by the pre-registration sensor 117. When the leading end of the sheet is detected by the pre-registration sensor 117, in step S705, the conveyance control portion 403 calculates the timing (clutch OFF timing) at which the control signal serving as the clutch OFF signal is issued to the transmission clutch 225. For the calculation of the clutch OFF timing, the deviation from the ideal timing of arrival at the pre-registration sensor 117 and the clutch timing information notified from the clutch timing adjusting portion 408 are used. The calculation method thereof will be described in detail later. The conveyance control portion 403 stands by in step S706 until the clutch OFF timing, and when the clutch OFF timing is reached, the conveyance control portion 403 instructs the clutch control portion 409 to issue the control signal in step S707. As a result of this, the transmission clutch 225 is switched from the coupled state to the released state in accordance with the control signal, and then the transmission mechanism 300 switches from the accelerated state to the regular speed state.

The clutch OFF timing in step S705 described above is calculated as follows. To be noted, in the description below, it is assumed that the sheet conveyance speed of the pre-registration rollers 116 is 300 mm/s in the regular speed state illustrated in FIG. 3B of the transmission mechanism 300, and is 450 mm/s in the accelerated state illustrated in FIG. 3A.

When the pre-registration sensor 117 detects the leading end of the sheet, the conveyance control portion 403 calculates the amount of delay from the ideal position of the leading end of the sheet. The delay amount is a value obtained by converting the delay time from the ideal arrival timing into a conveyance distance in the conveyance at the regular speed.

In the case where the delay amount is 6 mm, the clutch OFF timing can be calculated as follows. It is assumed that the conveyance control portion 403 has obtained a clutch response time of 10 ms and a gear change time of 20 ms as the clutch timing information notified from the clutch timing adjusting portion 408.

During the clutch response time of 10 ms, the roller driving shaft 330 illustrated in FIG. 3A rotates at the same angular speed as in the accelerated state. Therefore, the sheet advances 1.5 mm as compared with a case where it is assumed that the roller driving shaft 330 rotates at the angular velocity of the regular speed state during the clutch response time. In addition, during the gear change time of 20 ms, the roller driving shaft 330 does not receive the driving force from the driving motor 224, and thus can be regarded as not moving. Therefore, the sheet delays by 6 mm as compared with a case where it is assumed that the roller driving shaft 330 rotates at the angular velocity of the regular speed state during the gear change time.

In total of the above, a delay of 4.5 mm occurs during the delay time of 30 ms from the clutch OFF timing to completion of the speed change of the transmission mechanism 300 as compared with a case where it is assumed that the speed change of the transmission mechanism 300 completes instantly at the clutch OFF timing.

Therefore, the clutch OFF timing may be set such that a delay amount of 10.5 mm in total with the delay of 6 mm that has occurred before the arrival at the pre-registration sensor 117, is cancelled. The delay amount of 10.5 mm corresponds to 70 ms in consideration of the conveyance speed difference (150 mm/s) between the accelerated state and the regular speed state. Therefore, in step S705, the sheet position can be adjusted to the desired position by setting a time point 70 ms after the arrival of the leading end of the sheet at the pre-registration sensor 117 as the clutch OFF timing. In other words, the timing at which the control signal serving as the clutch OFF signal is issued while the conveyance operation is executed is changed in accordance with the timing at which the pre-registration sensor 117 serving as the sheet detection portion detects the sheet and the length of the delay time based on the detection result of the current detection portion 406 serving as the load detection portion such that the timing at which the sheet passes a predetermined position such as the registration sensor 119 downstream of the sheet detection portion in the sheet conveyance direction becomes closer to an aimed timing.

Since the clutch OFF timing is determined as described above, in the present embodiment, the clutch OFF timing in image formation becomes earlier when the clutch response time is longer in the case where the delay time from the clutch OFF timing to completion of the speed change of the transmission mechanism 300 is constant. In other words, the engine control portion 200 serving as a control portion changes the timing of the control signal in the sheet conveyance operation in accordance with the first response time from Ta to Tb that has elapsed after the control signal is issued to the transmission clutch 225 and before the motor current detected by the current detection circuit 222 starts decreasing. (i) In the case where the length of the first response time is a first time length, the control portion issues the control signal (S707) at a first timing after the pre-registration sensor 117 has issued the detection signal (S704) during the conveyance operation. In addition, (ii) in the case where the length of the first response time is a second time length longer than the first time length, the control portion issues the control signal (S707) at a second timing that is after the sensor has issued the detection signal (S704) during the conveyance operation and that is earlier than the first timing. To be noted, it is assumed herein that the detection timing of the pre-registration sensor 117 and the second response time from Tb to Tc are constant.

As a result of this, the phenomenon that the accelerated state of the transmission mechanism 300 serving as the first state is continued longer while switching the transmission clutch 225 and the sheet is displaced forward more when the clutch response time is longer can be compensated by setting the clutch OFF timing to be earlier.

In contrast, in the case where the delay time is constant, the clutch OFF timing in the image formation becomes later when the gear change time is longer. In other words, the engine control portion 200 serving as the control portion changes the timing of the control signal in the conveyance operation in accordance with a second response time (Tb to Tc) from when the control signal is issued to when the motor current detected by the current detection circuit 222 reaches a local minimum value after the current has started decreasing. (i) In a case where the length of the second response time is a third time length, the control portion issues the control signal (S707) at a third timing after the pre-registration sensor 117 has issued the detection signal (S704) during the conveyance operation. In addition, (ii) in a case where the length of the second response time is a fourth time length longer than the third time length, the control portion issues the control signal (S707) at a fourth timing that is after the pre-registration sensor 117 has issued the detection signal (S704) during the conveyance operation and that is later than the third timing. To be noted, it is assumed herein that the detection timing of the pre-registration sensor 117 and the first response time from Ta to Tb are constant.

As a result of this, the phenomenon that the sheet conveyance is delayed more due to the backlash between the gears or the like during switching of the drive transmission path when the gear change time is longer can be compensated by setting the clutch OFF timing to be later.

As described above, in the present embodiment, the delay time required for the speed change of the transmission mechanism 300 on the basis of the change in the load on the driving motor 224 when the speed change of the transmission mechanism 300 is performed is calculated, and the clutch OFF timing in image formation is changed on the basis of the calculated delay time. In other words, the engine control portion 200 serving as a control portion of the image forming apparatus changes, on the basis of the detection result of the current detection circuit 222 serving as a load detection portion, the clutch OFF timing in the conveyance operation of conveying the sheet to a conveyance portion at which the control signal serving as the clutch OFF signal for switching the transmission mechanism from the accelerated state serving as a first state to the regular speed state serving as a second state is issued, in accordance with the length of a delay time from when the control signal is issued to when the transmission mechanism is switched from the first state to the second state.

As a result of this, the precision of the sheet position in the sheet conveyance operation can be improved even in the case where the delay time required for the speed change of the transmission mechanism 300 varies due to factors such as the individual difference of products.

Second Embodiment

Figure 9:
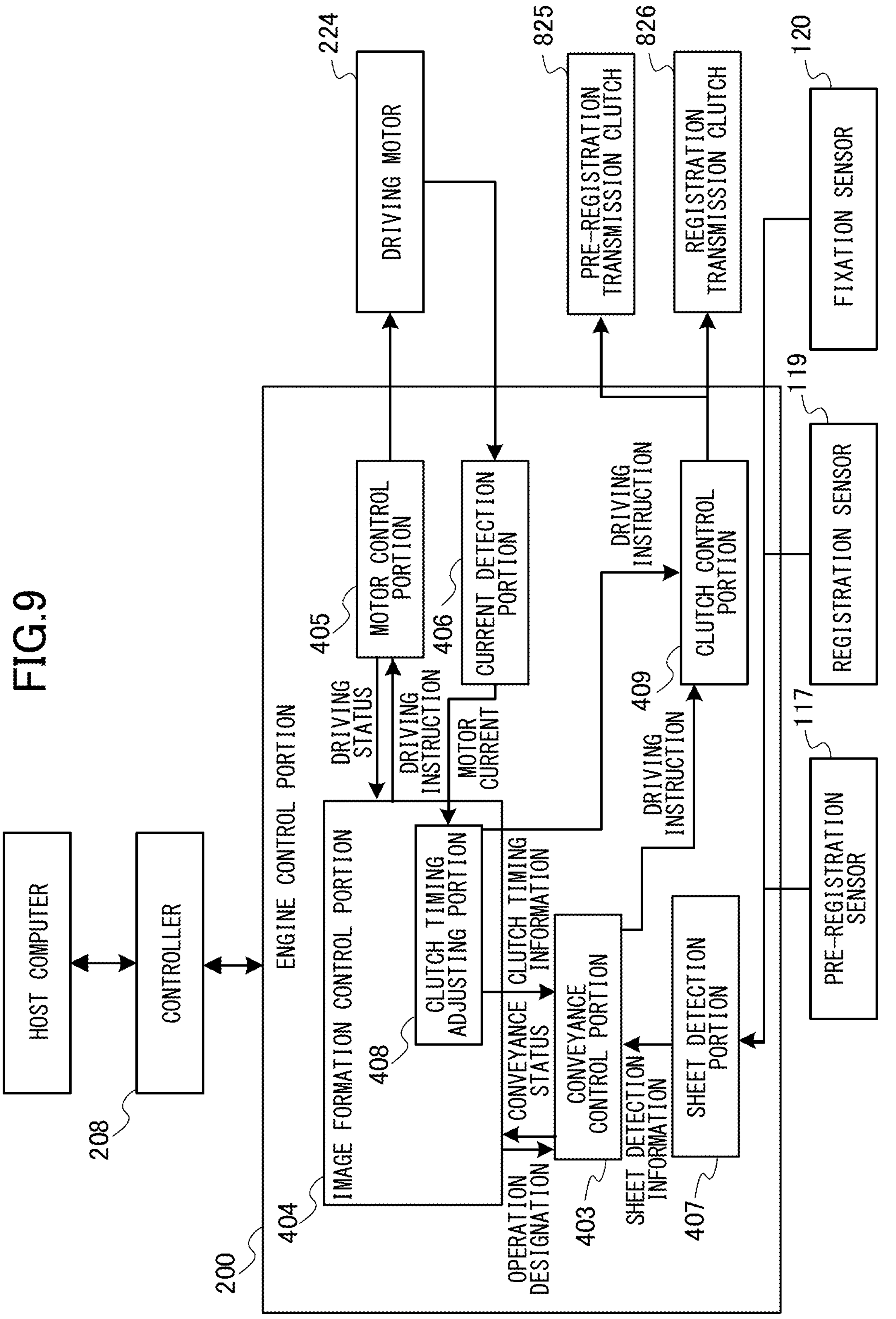
FIG. 9 is a diagram illustrating a system configuration of the image forming apparatus according to the second embodiment.
Figure 10:
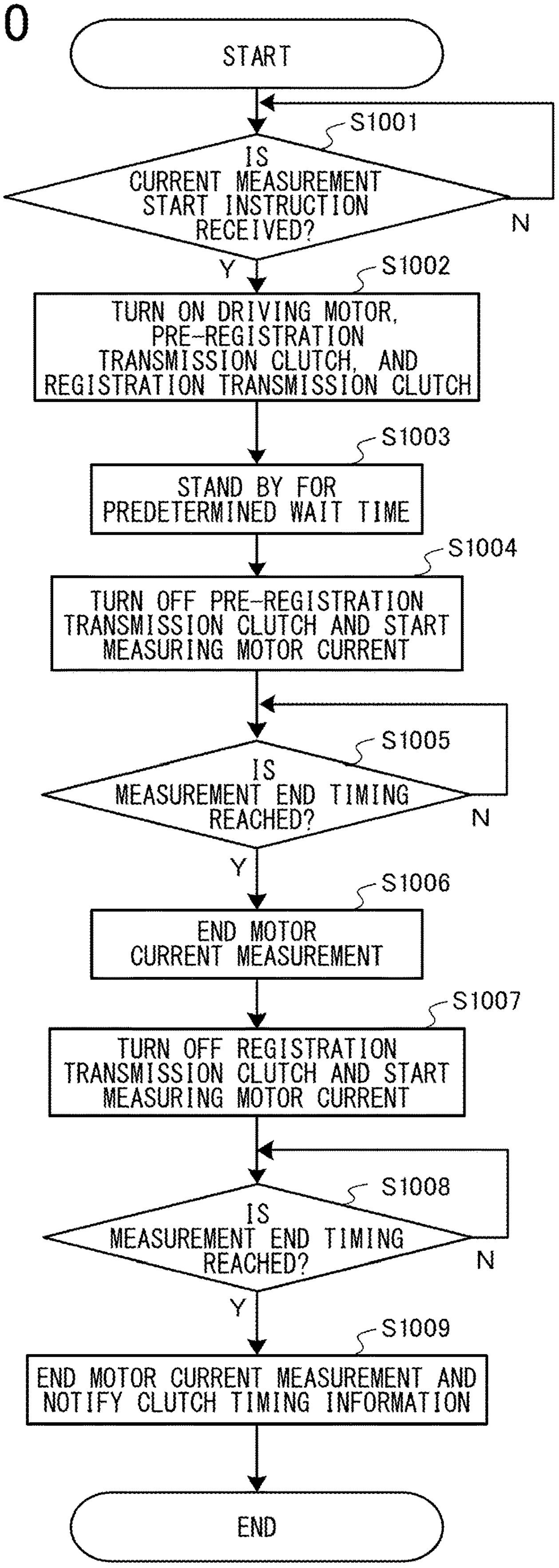
FIG. 10 is a flowchart illustrating an obtaining method for clutch timing information according to the second embodiment.

An image forming apparatus according to a second embodiment will be described with reference to FIGS. 8 to 10. The present embodiment is different from the first embodiment in that the control of the sheet position is performed by using a plurality of clutches in the configuration of executing the sheet conveyance operation by a driving force of a single motor, that is, a single drive source. In the description below, it is assumed that elements denoted by the same reference signs as in the first embodiment have substantially the same configurations and effects as those described in the first embodiment, and elements different from the first embodiment will be mainly described.

Hardware Configuration Diagram

Figure 8:
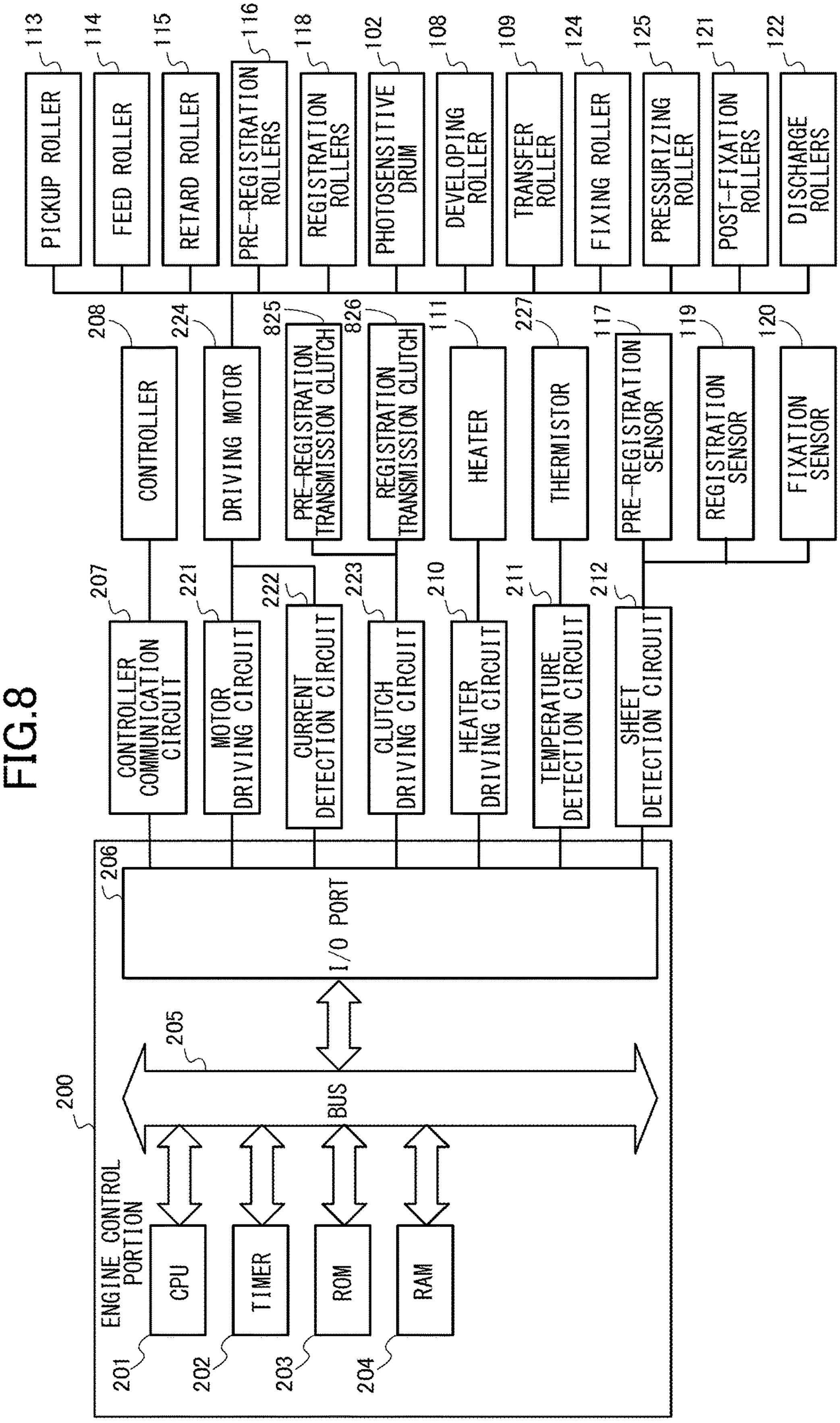
FIG. 8 is a diagram illustrating a hardware configuration of an image forming apparatus according to a second embodiment.

FIG. 8 is a hardware configuration diagram of the present embodiment. The configuration is basically the same as in the first embodiment, but in the present embodiment, a registration transmission clutch 826 is provided as another clutch in addition to a pre-registration transmission clutch 825 corresponding to the transmission clutch 225 of the first embodiment. The pre-registration transmission clutch 825 is an actuator that operates in accordance with a control signal from the clutch driving circuit 223, and changes the speed of a pre-registration transmission mechanism, which is the same as the transmission mechanism 300 of FIGS. 3A and 3B and interposed between the driving motor 224 and the pre-registration rollers 116 and the like. The registration transmission clutch 826 is an actuator that operates in accordance with a control signal from the clutch driving circuit 223 and changes the speed of a registration transmission mechanism that is a transmission mechanism interposed between the driving motor 224 and the registration rollers 118.

The pre-registration rollers 116 serve as a first conveyance portion in the present embodiment, and the registration rollers 118 serve as a second conveyance portion disposed downstream of the first conveyance portions in the present embodiment. The pre-registration transmission mechanism including the pre-registration transmission clutch 825 serves as a first transmission mechanism in the present embodiment, and the registration transmission mechanism including the registration transmission clutch 826 serves as a second transmission mechanism in the present embodiment. In addition, as the registration transmission mechanism including the registration transmission clutch 826, one having substantially the same configuration as the transmission mechanism 300 described with reference to FIGS. 3A and 3B can be used. That is, the registration transmission mechanism is switchable between the accelerated state serving as a third state in which the driving force of the driving motor 224 is transmitted to the registration rollers 118 and the regular speed state serving as a fourth state in which the driving force of the driving motor 224 is transmitted to the registration rollers 118 at a different transmission ratio from the accelerated state.

The sheet conveyance speed of the registration rollers 118 in the accelerated state of the registration transmission mechanism and the sheet conveyance speed of the pre-registration rollers 116 in the accelerated state of the pre-registration transmission mechanism are substantially equal. In addition, the sheet conveyance speed of the registration rollers 118 in the regular speed state of the registration transmission mechanism and the sheet conveyance speed of the pre-registration rollers 116 in the regular speed state of the pre-registration transmission mechanism are both substantially equal to the process speed.

Control Block Diagram

A system configuration of the present embodiment will be described with reference to a block diagram of FIG. 9. As illustrated in FIG. 9, the clutch control portion 409 issues a control signal to each of the pre-registration transmission clutch 825 and the registration transmission clutch 826 on the basis of an instruction from the conveyance control portion 403 or the clutch timing adjusting portion 408.

The clutch timing adjusting portion 408 calculates the clutch response time and the gear change time related to the pre-registration transmission mechanism from the change in the motor current when speed change of the pre-registration transmission mechanism is performed by operating the pre-registration transmission clutch 825 while the driving motor 224 is rotating. Similarly, the clutch timing adjusting portion 408 calculates the clutch response time and the gear change time related to the registration transmission mechanism from the change in the motor current when speed change of the registration transmission mechanism is performed by operating the registration transmission clutch 826 while the driving motor 224 is rotating. The clutch timing adjusting portion 408 notifies the conveyance control portion 403 of the clutch response time and the gear change time of the pre-registration transmission mechanism and the registration mechanism as the clutch timing information.

The conveyance control portion 403 adjusts the sheet position in the sheet conveyance operation by changing the speed change timing of the pre-registration transmission mechanism and the registration transmission mechanism in the image formation on the basis of the clutch timing information notified from the clutch timing adjusting portion 408.

Obtaining Method for Clutch Timing Information

An obtaining method for the clutch timing information will be described. In the present embodiment, a plurality of transmission mechanisms each including a transmission clutch are provided unlike the first embodiment, and therefore the change in the motor current when the speed change of the transmission mechanisms is performed needs to be measured individually. FIG. 10 illustrates a flowchart representing processing that the clutch timing adjusting portion 408 according to the present embodiment performs when obtaining the clutch timing information. The processing of FIG. 10 is performed in an initial operation performed by the engine control portion 200 when the power of the image forming apparatus is turned on, when the image forming apparatus wakes up from a sleep state, or when the image forming apparatus recovers from an abnormality such as a jam.

When the image formation control portion 404 starts the initial operation and takes a state in which the clutch timing information may be obtained, a current measurement start instruction instructing the start of measurement of the motor current is issued from the image formation control portion 404 to the clutch timing adjusting portion 408 in step S1001. Then, in step S1002, the clutch timing adjusting portion 408 instructs the motor control portion 405 and the clutch control portion 409 to start the rotation of the driving motor 224 and switch the pre-registration transmission clutch 825 and the registration transmission clutch 826 to the coupled state. Then, in step S1003, the clutch timing adjusting portion 408 stands by for a preset wait time until the operation of the driving motor 224, the pre-registration transmission clutch 825, and the registration transmission clutch 826 is stabilized.

After the elapse of the wait time, in step S1004, the clutch timing adjusting portion 408 instructs the clutch control portion 409 to issue a control signal serving as the clutch OFF signal for switching the pre-registration transmission clutch 825 to the released state in a state in which the rotation of the driving motor 224 is continued. In addition, in step S1004, the clutch timing adjusting portion 408 starts measuring the motor current detected by the current detection portion 406. Then, in step S1005, the clutch timing adjusting portion 408 continues measurement of the motor current for a time that is preset as a time sufficient for the pre-registration transmission clutch 825 to switch to the released state and for the pre-registration transmission mechanism to switch to the regular speed state.

After the elapse of the time described above and when a measurement end timing for the motor current is reached, the clutch timing adjusting portion 408 finishes the measurement of the motor current in step S1006. In addition, in step S1006, the clutch timing adjusting portion 408 calculates the clutch response time and the gear change time related to the pre-registration transmission mechanism by the estimation method described with reference to FIG. 5.

Then, in step S1007, the clutch timing adjusting portion 408 instructs the clutch control portion 409 to issue a control signal serving as the clutch OFF signal for switching the registration transmission clutch 826 to the released state in a state in which the rotation of the driving motor 224 is continued. In addition, in step S1007, the clutch timing adjusting portion 408 starts measuring the motor current detected by the current detection portion 406. Then, in step S1008, the clutch timing adjusting portion 408 continues measurement of the motor current for a time that is preset as a time sufficient for the registration transmission clutch 826 to switch to the released state and for the registration transmission mechanism to switch to the regular speed state.

After the elapse of the time described above and when a measurement end timing for the motor current is reached, the clutch timing adjusting portion 408 finishes the measurement of the motor current in step S1009. In addition, in step S1009, the clutch timing adjusting portion 408 calculates the clutch response time and the gear change time related to the registration transmission mechanism by the estimation method described with reference to FIG. 5.

Then, the clutch timing adjusting portion 408 notifies the conveyance control portion 403 of the clutch response time and the gear change time of the pre-registration transmission mechanism and the registration transmission mechanism as a measurement result of the motor current and as the clutch timing information.

To be noted, although a plurality of clutches are individually operated and the motor current is measured for each of these in the present embodiment, the measurement may be simultaneously performed in the case where the individual timings can be detected even when the clutches are simultaneously operated.

Sheet Conveyance Adjustment in Feeding

Figure 11:
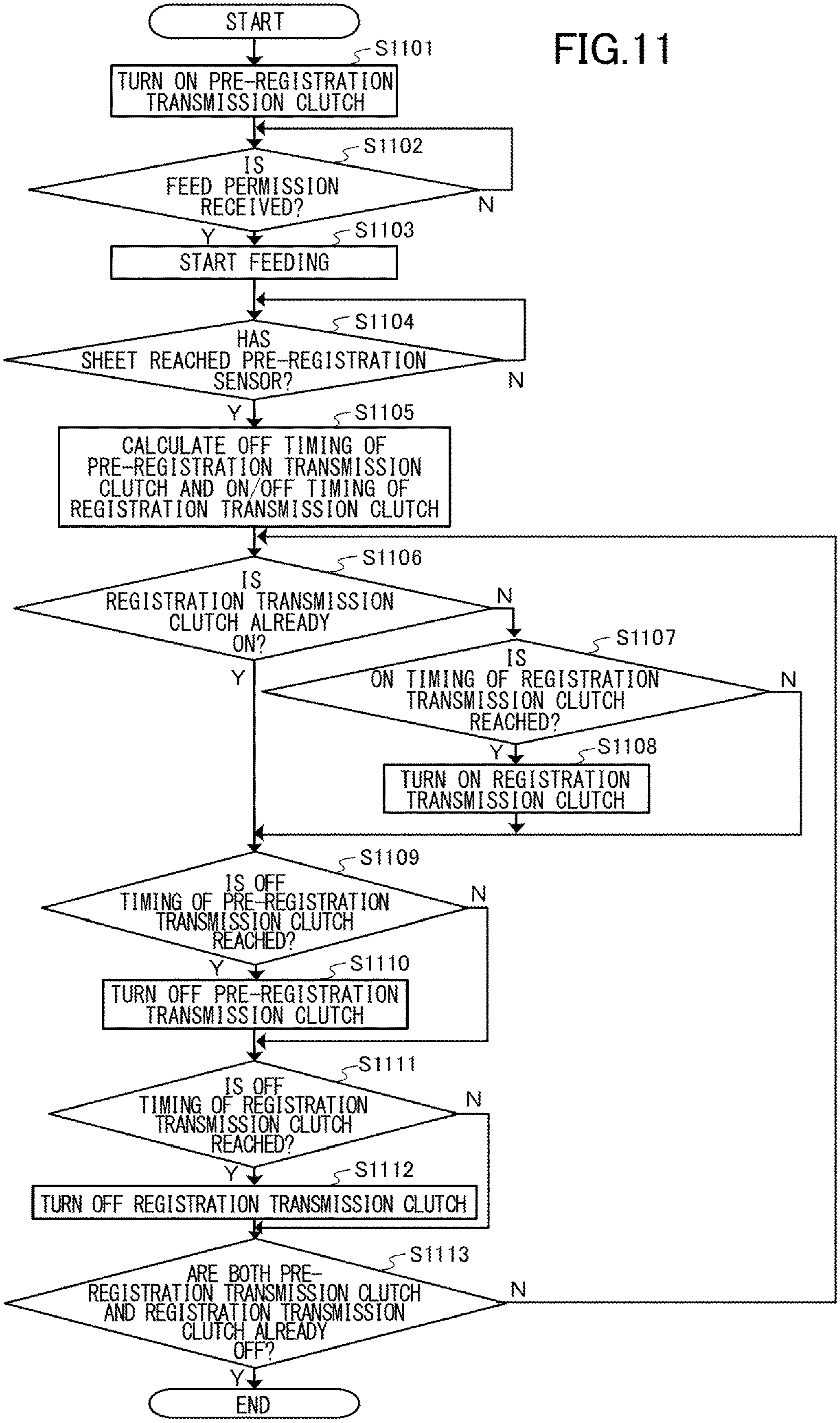
FIG. 11 is a flowchart illustrating a control method for a sheet conveyance operation according to the second embodiment.

A method for adjusting the sheet position in the sheet conveyance operation by using the clutch timing information will be described with reference to FIG. 11. The flow of FIG. 11 is executed by the conveyance control portion 403 on the basis of an instruction from the image formation control portion 404 illustrated in FIG. 4 in the case where an instruction to execute the image formation, that is, a job is input to the image forming apparatus 100.

In step S1101, first, after the preparation operation and before the issue of the feed permission, the conveyance control portion 403 instructs the clutch control portion 409 to issue a control signal serving as a clutch ON signal for switching the pre-registration transmission clutch 825 to the coupled state in advance. It is assumed that the driving motor 224 has been continuously rotating from the preparation operation. As a result of this, the feed roller 114, the retard roller 115, and the pre-registration rollers 116 are driven via the pre-registration transmission mechanism in the accelerated state. When the feed permission is issued from the image formation control portion 404 in step S1102, the conveyance control portion 403 starts the feeding of the sheet by the pickup roller 113 by the unillustrated starting portion in step S1103.

After the feeding of the sheet is started, the conveyance control portion 403 stands by in step S1104 until the leading end of the sheet is detected by the pre-registration sensor 117. When the leading end of the sheet is detected by the pre-registration sensor 117, in step S1105, the conveyance control portion 403 calculates the timing (clutch OFF timing) at which the control signal serving as the clutch OFF signal is issued to the pre-registration transmission clutch 825. For the calculation of the clutch OFF timing, the deviation from the ideal timing of arrival at the pre-registration sensor 117 and the clutch timing information notified from the clutch timing adjusting portion 408 are used.

In addition, in step S1105, the conveyance control portion 403 calculates the clutch ON timing and the clutch OFF timing of the registration transmission clutch 826. The clutch ON timing of the registration transmission clutch 826 is set such that the registration rollers 118 are switched to the accelerated state before the leading end of the sheet reaches the registration rollers 118. This operation will be described in detail later.

After this, the conveyance control portion 403 stands by until the clutch OFF timing, and in steps S1106 to S1113, instructs the clutch control portion 409 to switch the corresponding clutch to the released state at the clutch OFF timing. To be noted, although the clutch OFF timing of the pre-registration transmission clutch 825 is before the clutch OFF timing of the registration transmission clutch 826 in the illustrated flow, this relationship changes depending on the calculation result of the clutch OFF timing.

Figure 12A:
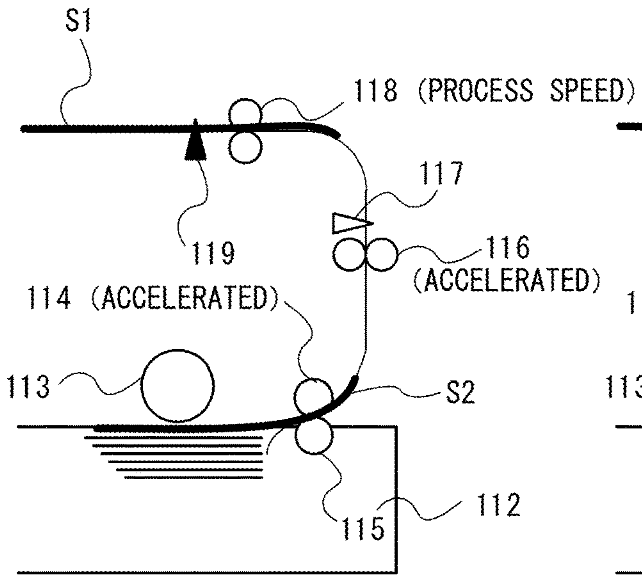
FIGS. 12A to 12C are each a schematic diagram illustrating a sheet conveyance operation according to the second embodiment.

The flow of the sheet conveyance operation under the control of the present embodiment will be described with reference to FIGS. 12A to 12C. FIG. 12A illustrates a state in which a preceding sheet S1 is receiving transfer of an image in the transfer portion while being conveyed by the registration rollers 118 at the process speed, which is after the feeding of a succeeding sheet S2 is started, and which corresponds to steps S1103 and S1104. As described above, since the feeding of the succeeding sheet S2 is started in a state in which the pre-registration transmission mechanism is set to the accelerated state in advance, the succeeding sheet S2 comes closer to the preceding sheet S1 as the conveyance progresses.

Figure 12B:
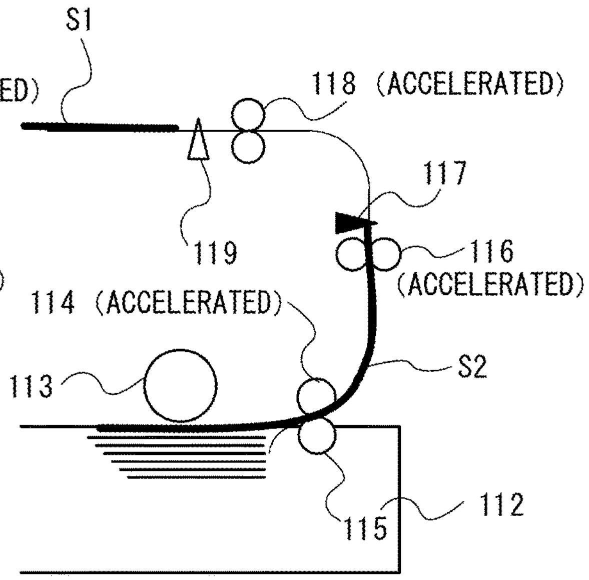

FIG. 12B illustrates a state corresponding to step S1104 when the leading end of the succeeding sheet S2 has reached the pre-registration sensor 117. After the arrival at the pre-registration sensor 117, the succeeding sheet S2 is still conveyed by the pre-registration rollers 116 in the accelerated state, and therefore comes closer to the preceding sheet S1. In addition, the registration rollers 118 are switched to the accelerated state in steps S1106 to S1107 before the succeeding sheet S2 reaches the registration rollers 118.

Figure 12C:
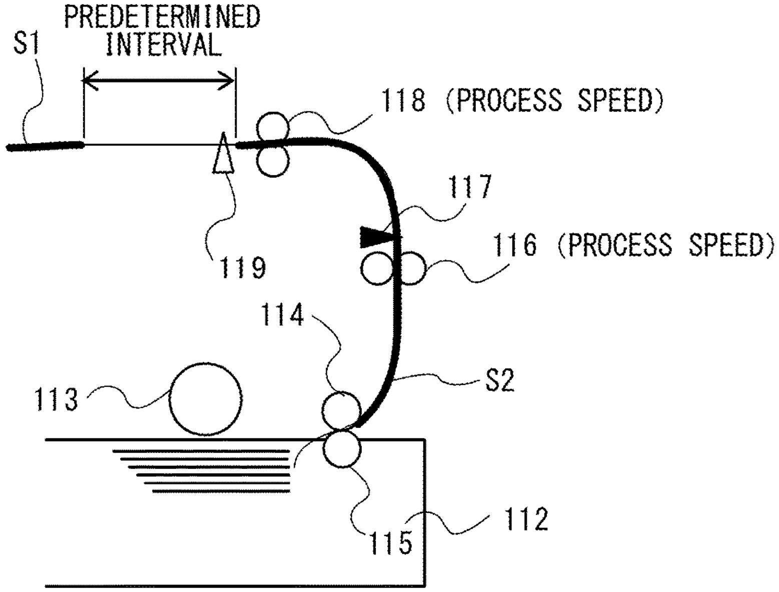

FIG. 12C illustrates a state immediately after the pre-registration transmission mechanism and the registration transmission mechanism are switched to the regular speed state. At this time, the leading end of the succeeding sheet S2 is conveyed at the process speed by the registration rollers 118 and the pre-registration rollers 116 at a predetermined interval from the trailing end of the preceding sheet S1. In other words, the clutch OFF timings of the pre-registration transmission clutch 825 and the registration transmission clutch 826 are set such that the sheet interval between the preceding sheet S1 and the succeeding sheet S2 at the time when the speed change of the pre-registration transmission mechanism and the registration transmission mechanism is completed is a preset interval. In the present embodiment, the succeeding sheet S2 can be conveyed at a speed higher than the process speed even after the leading end of the succeeding sheet S2 has reached the registration rollers 118, and thus the range in which the delay of the sheet can be corrected can be widened as compared with the first embodiment.

To be noted, the pre-registration transmission clutch 825 and the registration transmission clutch 826 are driven at such clutch OFF timings that speed change of the pre-registration transmission mechanism and the registration transmission mechanism is completed before the leading end of the sheet reaches the registration sensor 119 as indicated by steps S1109 to S1113.

Next, a calculation method for the clutch OFF timing in step S1105 of FIG. 11 will be described in detail. In the present embodiment, the clutch OFF timing of the pre-registration transmission clutch 825 and the clutch OFF timing of the registration transmission clutch 826 are individually calculated. In the description below, it is assumed that the sheet conveyance speed of the present embodiment is also 300 mm/s in the regular speed state of the pre-registration transmission mechanism and the registration transmission mechanism and 450 mm/s in the accelerated state of the pre-registration transmission mechanism and the registration transmission mechanism.

Similarly to the first embodiment, when the pre-registration sensor 117 detects the leading end of the sheet, the conveyance control portion 403 calculates the amount of delay from the ideal position of the leading end of the sheet. In the case where the delay amount is 21 mm, the clutch OFF timings of the pre-registration transmission clutch 825 and the registration transmission clutch 826 can be calculated as follows.

It is assumed that the conveyance control portion 403 has been notified from the clutch timing adjusting portion 408 that the clutch response time and the gear change time of the pre-registration transmission clutch 825 are respectively 10 ms and 20 ms. In addition, it is assumed that the conveyance control portion 403 has been notified from the clutch timing adjusting portion 408 that the clutch response time and the gear change time of the registration transmission clutch 826 are respectively 5 ms and 10 ms.

In this case, the amount of delay of the sheet that occurs in a period from the clutch OFF timing of the pre-registration transmission clutch 825 to completion of the speed change of the pre-registration transmission mechanism is 4.5 mm, which is the sum of forward displacement of 1.5 mm during the clutch response time and backward displacement of 6 mm during the gear change time. In addition, the amount of delay of the sheet that occurs in a period from the clutch OFF timing of the registration transmission clutch 826 to completion of the speed change of the registration transmission mechanism is 2.25 mm, which is the sum of forward displacement of 0.75 mm during the clutch response time and backward displacement of 3 mm during the gear change time.

The clutch OFF timing of the pre-registration transmission clutch 825 may be set to cancel a delay amount of 25.5 mm in total with the delay of 21 mm that has occurred before the arrival at the pre-registration sensor 117. The delay amount of 25.5 mm corresponds to 170 ms in consideration of the conveyance speed difference (150 mm/s) between the accelerated state and the regular speed state. Therefore, in step S1105, the clutch OFF timing of the pre-registration transmission clutch 825 may be set to 170 ms after the arrival of the leading end of the sheet at the pre-registration sensor 117.

In addition, the clutch OFF timing of the registration transmission clutch 826 may be set to cancel a delay amount of 23.25 mm in total with the delay of 21 mm that has occurred before the arrival at the pre-registration sensor 117. The delay amount of 23.25 mm corresponds to 155 ms in consideration of the conveyance speed difference (150 mm/s) between the accelerated state and the regular speed state. Therefore, in step S1105, the clutch OFF timing of the registration transmission clutch 826 may be set to 155 ms after the arrival of the leading end of the sheet at the pre-registration sensor 117.

To be noted, in the case where the delay amount when the pre-registration sensor 117 detects the sheet is small, the pre-registration transmission mechanism is switched from the accelerated state to the regular speed state before the leading end of the sheet reaches the registration rollers 118. In this case, the registration transmission mechanism does not have to be switched to the accelerated state, and therefore the registration transmission clutch 826 may be maintained in the released state in processing after step S1105 regardless of the clutch OFF timing of the registration transmission clutch 826.

In addition, regarding the clutch ON timing of the registration transmission clutch 826, the registration transmission clutch 826 may be turned on at a timing with a sufficient margin for the variation of switching because it suffices as long as the registration rollers 118 are switched to the accelerated state before the leading end of the sheet reaches the registration rollers 118. To be noted, similarly to the clutch OFF timing, the delay time including the clutch response time and the gear change time at the time of coupling of the registration transmission clutch 826 may be estimated when measuring the clutch timing information, and the clutch ON timing may be set on the basis of the result of the estimation. Also in this case, the registration transmission clutch 826 is maintained in the released state if the clutch ON timing of the registration transmission clutch 826 is later than the clutch OFF timing calculated by the calculation method described above.

As has been described above, also in the present embodiment, the delay time required for the speed change of the transmission mechanism is calculated on the basis of the change in the load on the driving motor 224 when the speed change of the transmission mechanism is performed, and the clutch OFF timing in image formation is changed on the basis of the calculated delay time. In other words, the engine control portion 200 serving as a control portion of the image forming apparatus changes, on the basis of the detection result of the current detection circuit 222 serving as a load detection portion, the clutch OFF timing in the conveyance operation of conveying the sheet to a conveyance portion at which the control signal for switching the transmission mechanism from the accelerated state serving as a first state to the regular speed state serving as a second state is issued, in accordance with the length of a delay time from when the control signal is issued to when the transmission mechanism is switched from the first state to the second state.

As a result of this, the precision of the sheet position in the sheet conveyance operation can be improved even in the case where the delay time required for the speed change of the transmission mechanism 300 varies due to factors such as the individual difference of products.

In addition, in the present embodiment, in a configuration in which a plurality of conveyance portions are driven by a single drive source via a plurality of transmission mechanisms, the clutch OFF timing of each of the plurality of transmission mechanisms is changed in accordance with a delay time required for speed change of the transmission mechanism. As a result of this, the precision of the sheet position in the sheet conveyance operation can be further improved in the case where the delay time required for the speed change varies among the plurality of transmission mechanisms.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-163268, filed on Oct. 4, 2021, which is hereby incorporated by reference herein in its entirety.

What is claimed is:

1. A sheet conveyance apparatus comprising:

a motor configured to generate a driving force;

a conveyance roller configured to be driven by the driving force to convey a sheet;

a transmission mechanism configured to switch between a first state in which the transmission mechanism transmits the driving force to the conveyance roller at a first transmission ratio, and a second state in which the transmission mechanism transmits the driving force to the conveyance roller at a second transmission ratio different from the first transmission ratio, the transmission mechanism including (a) a plurality of drive transmission paths configured to transmit the driving force to the conveyance roller at transmission ratios different from each other and (b) an actuator configured to switch a path in which the driving force is transmitted among the plurality of drive transmission paths;

a load detection portion configured to detect a load acting on the motor; and a control portion configured to control the motor and the transmission mechanism and execute a conveyance operation in which the conveyance roller conveys the sheet, wherein the control portion is configured to change, on a basis of a detection result of the load detection portion, a timing in the conveyance operation at which a control signal for switching the transmission mechanism from the first state to the second state is issued, the timing being changed in accordance with a delay time from when the control signal is issued to when change in the load corresponding to the switching of the transmission mechanism from the first state to the second state appears, wherein the plurality of drive transmission paths include a first gear train and a second gear train having different gear ratios from each other, wherein the actuator is an electromagnetic clutch configured to switch between a coupled state and a released state on a basis of a control signal from the control portion, and wherein the transmission mechanism is configured such that (i) in a case where the electromagnetic clutch is in the coupled state, the driving force is transmitted to the conveyance roller via the first gear train, and (ii) in a case where the electromagnetic clutch is in the released state, the driving force is transmitted to the conveyance roller via the second gear train.

2. The sheet conveyance apparatus according to claim 1, further comprising:

a sheet detection portion configured to detect the sheet conveyed by the conveyance roller, wherein the control portion is configured to determine the timing in the conveyance operation at which the control signal is issued, on a basis of the delay time and a timing at which the sheet detection portion has detected the sheet.

3. The sheet conveyance apparatus according to claim 2, wherein the conveyance roller includes a plurality of conveyance rollers arranged along a conveyance path to an image forming portion, and wherein the control portion is configured to determine the timing at which the control signal is issued, such that an interval between sheets passing through the image forming portion in a case where a plurality of sheets are conveyed one by one becomes closer to a predetermined interval.

4. The sheet conveyance apparatus according to claim 1, wherein a sheet conveyance speed of the conveyance roller in a case where the transmission mechanism is in the first state is higher than the sheet conveyance speed of the conveyance roller in a case where the transmission mechanism is in the second state.

5. The sheet conveyance apparatus according to claim 1, wherein the conveyance roller is a first conveyance roller, and the transmission mechanism is a first transmission mechanism, wherein the sheet conveyance apparatus further comprises:

a second conveyance roller disposed downstream of the first conveyance roller in a sheet conveyance direction and configured to be driven by the driving force to convey the sheet; and a second transmission mechanism configured to switch between a third state in which the second transmission mechanism transmits the driving force to the second conveyance roller, and a fourth state in which the second transmission mechanism transmits the driving force to the second conveyance roller at a transmission ratio different from the transmission ratio of the third state, and wherein the control portion is configured to change, on a basis of the detection result of the load detection portion, a timing in the conveyance operation at which a second control signal for switching the second transmission mechanism from the third state to the fourth state is issued, in accordance with a delay time from when the second control signal is issued to when change in the load corresponding to the switching of the second transmission mechanism from the third state to the fourth state appears, separately from the delay time of the first transmission mechanism.

6. The sheet conveyance apparatus according to claim 1, wherein the control portion is configured to determine, on a basis of the delay time measured during the conveyance operation of a preceding sheet, the timing in the conveyance operation of a succeeding sheet at which the control signal is issued, the succeeding sheet being conveyed after the preceding sheet.

7. The sheet conveyance apparatus according to claim 1, wherein the control portion is configured to determine the timing in the conveyance operation at which the control signal is issued, on a basis of the delay time measured in a state in which the motor is caused to generate the driving force without the conveyance roller conveying the sheet.

8. The sheet conveyance apparatus according to claim 1, wherein the load detection portion includes a current detection circuit configured to detect a current supplied to the motor, and wherein the control portion is configured to use, as the delay time, a time from when a control signal for operating the electromagnetic clutch to switch the transmission mechanism from the first state to the second state is issued to when the current detected by the current detection circuit reaches a local minimum value in response to a switch of the transmission mechanism from the first state to the second state.

9. The sheet conveyance apparatus according to claim 8, wherein the control portion is configured to set the timing in the conveyance operation at which the control signal is issued to be earlier in a case where a response time of the electromagnetic clutch in the delay time is longer, and set the timing in the conveyance operation at which the control signal is issued to be later in a case where, in the delay time, a time that the transmission mechanism has taken to switch from the first state to the second state after elapse of the response time of the electromagnetic clutch is longer.

10. An image forming apparatus comprising:

the sheet conveyance apparatus according to claim 1; and an image forming portion configured to form an image on the sheet conveyed by the sheet conveyance apparatus.

11. A sheet conveyance apparatus comprising:

a motor configured to generate a driving force;

a conveyance roller configured to be driven by the driving force to convey a sheet;

a transmission mechanism including an electromagnetic clutch and configured to transmit the driving force to the conveyance roller and switch, in accordance with power supply to the electromagnetic clutch being turned on or off, between a first state in which the conveyance roller conveys the sheet at a first speed and a second state in which the conveyance roller conveys the sheet at a second speed lower than the first speed;

a current detection circuit configured to detect a current supplied to the motor;

a sensor configured to issue a detection signal in response to the sheet conveyed by the conveyance roller; and a control portion configured to control the motor and the electromagnetic clutch and execute a conveyance operation in which the conveyance roller conveys the sheet, wherein the control portion is configured to issue a control signal for switching the transmission mechanism from the first state to the second state before the conveyance operation is started, and change a timing of the control signal in the conveyance operation in accordance with a first response time from when the control signal is issued to when the current detected by the current detection circuit starts decreasing, such that (i) in a case where a length of the first response time is a first time length, the control signal is issued at a first timing after the sensor has issued the detection signal during the conveyance operation, and (ii) in a case where the length of the first response time is a second time length longer than the first time length, the control signal is issued at a second timing that is after the sensor has issued the detection signal during the conveyance operation and that is earlier than the first timing.

12. A sheet conveyance apparatus comprising:

a motor configured to generate a driving force;

a conveyance roller configured to be driven by the driving force to convey a sheet;

a transmission mechanism including an electromagnetic clutch and configured to transmit the driving force to the conveyance roller and switch, in accordance with power supply to the electromagnetic clutch being turned on or off, between a first state in which the conveyance roller conveys the sheet at a first speed and a second state in which the conveyance roller conveys the sheet at a second speed lower than the first speed;

a current detection circuit configured to detect a current supplied to the motor;

a sensor configured to issue a detection signal in response to the sheet conveyed by the conveyance roller; and a control portion configured to control the motor and the electromagnetic clutch and execute a conveyance operation in which the conveyance roller conveys the sheet, wherein the control portion is configured to issue a control signal for switching the transmission mechanism from the first state to the second state before the conveyance operation is started, and change a timing of the control signal in the conveyance operation in accordance with a second response time from when the control signal is issued to when the current detected by the current detection circuit reaches a local minimum value after the current detected by the current detection circuit has started decreasing, such that (i) in a case where a length of the second response time is a third time length, the control signal is issued at a third timing after the sensor has issued the detection signal during the conveyance operation, and (ii) in a case where the length of the second response time is a fourth time length longer than the third time length, the control signal is issued at a fourth timing that is after the sensor has issued the detection signal during the conveyance operation and that is later than the third timing.

* * * * *